(12) United States Patent
Li et al.

(10) Patent No.: US 11,516,825 B2
(45) Date of Patent: Nov. 29, 2022

(54) DATA PROCESSING METHOD, NODE AND TERMINAL

(71) Applicant: ZTE CORPORATION, Shenzhen (CN)

(72) Inventors: Xincai Li, Shenzhen (CN); Yajun Zhao, Shenzhen (CN); Hanging Xu, Shenzhen (CN); Ling Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 413 days.

(21) Appl. No.: 16/336,774

(22) PCT Filed: Sep. 12, 2017

(86) PCT No.: PCT/CN2017/101427
§ 371 (c)(1),
(2) Date: Jun. 14, 2019

(87) PCT Pub. No.: WO2018/059230
PCT Pub. Date: Apr. 5, 2018

(65) Prior Publication Data
US 2021/0298046 A1 Sep. 23, 2021

(30) Foreign Application Priority Data
Sep. 27, 2016 (CN) .......................... 201610857126.X

(51) Int. Cl.
*H04W 52/34* (2009.01)
*H04W 72/12* (2009.01)
(Continued)

(52) U.S. Cl.
CPC ....... *H04W 72/1268* (2013.01); *H04L 1/1896* (2013.01); *H04W 52/367* (2013.01);
(Continued)

(58) Field of Classification Search
None
See application file for complete search history.

(56) References Cited

U.S. PATENT DOCUMENTS

2011/0275361 A1* 11/2011 Yavuz ................. H04W 52/244
455/422.1
2012/0128084 A1* 5/2012 Aguirre ................. H04W 36/32
375/260
(Continued)

FOREIGN PATENT DOCUMENTS

CN 102857305 A 1/2013
CN 104640117 A 5/2015
(Continued)

OTHER PUBLICATIONS

International Search Report for International Application No. PCT/CN2017/101427; Date of Completion: Nov. 15, 2017; dated Nov. 29, 2017; 2 Pages.
(Continued)

*Primary Examiner* — Brandon M Renner
(74) *Attorney, Agent, or Firm* — Li & Cai Intellectual Property (USA) Office

(57) ABSTRACT

Provided are a data processing method, node and terminal. The method includes: before sending data, a first node performing a perception measurement on a first channel of transmission data within a pre-determined time duration; the first node acquiring a first perception measurement result of the perception measurement; and the first node processing data according to the first perception measurement result. By means of the embodiments of the present application, the problems in the relevant art of an interference between uplink and downlink data transmissions of a neighbor cell or a present cell, and a resource collision can be solved.

16 Claims, 6 Drawing Sheets

Before sending data, perform, by a first node, a perception measurement on a first channel transmitting the data within a pre-determined duration — S202

Acquire, by the first node, a first perception measurement result of the perception measurement — S204

Process, by the first node, the data according to the first perception measurement result — S206

(51) Int. Cl.
  *H04W 76/11* (2018.01)
  *H04L 1/18* (2006.01)
  *H04W 52/36* (2009.01)
  *H04W 72/04* (2009.01)

(52) U.S. Cl.
  CPC ... *H04W 72/0446* (2013.01); *H04W 72/0453* (2013.01); *H04W 72/1231* (2013.01); *H04W 72/1289* (2013.01); *H04W 76/11* (2018.02)

(56) References Cited

U.S. PATENT DOCUMENTS

| | | | |
|---|---|---|---|
| 2013/0310062 A1 | 11/2013 | Liu et al. | |
| 2014/0313925 A1* | 10/2014 | Seo | H04B 17/345 370/252 |
| 2015/0078189 A1* | 3/2015 | Kwon | H04W 24/08 370/252 |
| 2015/0365206 A1 | 12/2015 | Yaacoub et al. | |
| 2016/0037550 A1* | 2/2016 | Barabell | H04W 72/046 455/450 |
| 2016/0081031 A1* | 3/2016 | Barriac | H04W 52/245 370/311 |
| 2016/0216360 A1* | 7/2016 | Georgy | G01S 5/0263 |
| 2016/0219448 A1* | 7/2016 | Davydov | H04W 74/0816 |
| 2016/0302157 A1* | 10/2016 | Lasaulce | H04B 17/336 |
| 2017/0311333 A1* | 10/2017 | Fitch | H04W 16/04 |
| 2018/0035393 A1* | 2/2018 | Kazmi | H04W 52/346 |

FOREIGN PATENT DOCUMENTS

| | | |
|---|---|---|
| CN | 104796206 A | 7/2015 |
| WO | 2014166455 A1 | 10/2014 |
| WO | 2015079174 A1 | 6/2015 |
| WO | 2016144216 A1 | 9/2016 |

OTHER PUBLICATIONS

China Patent Office, First Office Action dated Jan. 5, 2022 for application No. CN201610857126.X.
China Patent Office, Second Office Action dated Jun. 13, 2022 for application No. CN201610857126.X.

* cited by examiner

DATA PROCESSING METHOD, NODE AND TERMINAL

CROSS-REFERENCE TO RELATED APPLICATION

This is a continuation application, under 35 U.S.C. § 371, of PCT Application No. PCT/CN2017/101427, filed Sep. 12, 2017, which is based upon and claims priority to Chinese Patent Application No. 201610857126.X, filed Sep. 27, 2016, the entire contents of which are incorporated herein by reference.

TECHNICAL FIELD

The present disclosure relates to the field of communications, and more particularly, to a data processing method, node and terminal.

BACKGROUND

It has been a common sense that the $5^{th}$-Generation Mobile Networks (5G) supports flexible data transceiving or dynamic Time Division Duplexing (TDD). However, if each cell dynamically and adaptively changes a frame structure or uplink and downlink configurations according to service loads, a problem of DL-to-UL (Downlink to UpLink) Interference (also known as eNB-to-eNB interference) or UL-to-DL Interference (also known as UE-to-UE Interference) between neighboring cells may be brought, which will affect the data transmission performances. Similarly, the same problem happens to uplink and downlink data transmission in the case of full duplex.

In addition, with the wide application of Internet of Things and the continuous increase of wireless terminals, the original terminal data sending method based on base station scheduling will face great challenges. Scheduling-free data transmission method will be used as a candidate data transmission method, and the access method can significantly reduce signaling overhead, shorten access delay and save the power consumption of the terminal. However, under normal circumstances, devices used in the scheduling-free access method randomly select resources to directly transmit data. For an orthogonal multiple access system, the method may inevitably cause resource collision, especially in the scenario of mass connections.

Therefore, the issue of reducing the interference and resource collision among neighboring cells or between uplink and downlink data transmissions needs to be solved.

This section provides background information related to the present disclosure which is not necessarily prior art.

SUMMARY

The embodiments of the present disclosure provide a data processing method, node and terminal to at least solve the problems of interference and resource collision among neighboring cells or between uplink and downlink data transmissions in the local cell in the related art.

According to an embodiment of the present disclosure, there is provided a data processing method, including: before sending data, performing, by a first node, a perception measurement on a first channel transmitting the data within a pre-determined duration; acquiring, by the first node, a first perception measurement result of the perception measurement; and processing, by the first node, the data according to the first perception measurement result.

In the embodiments of the present application, the first node is notified of the pre-determined duration through one of the following manners: notifying the first node of the pre-determined duration through a dynamic physical layer signaling indication; notifying the first node of the pre-determined duration through a high-layer signaling semi-static configuration; notifying the first node of the pre-determined duration through a multicast signaling or a system message; and notifying the first node of the pre-determined duration through a predefined manner.

In the embodiments of the present application, the pre-determined duration is set according to a Quality of Service QoS or a grade of service corresponding to the data.

In the embodiments of the present application, the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled by the downlink control information in the frame, or filling the pre-determined duration between the region for sending downlink control information and a downlink service data region scheduled by the downlink control information in the frame; and filling the pre-determined duration at the beginning or end of a time slot in which the frame is located.

In the embodiments of the present application, the processing, by the first node, the data according to the first perception measurement result includes: determining, by the first node, a sending power for sending the data according to the perception measurement result; and sending, by the first node, the data through the sending power.

In the embodiments of the present application, the determining, by the first node, the sending power for sending the data according to the first perception measurement result includes: in the case that an energy of the first channel transmitting the data is less than or equal to a pre-determined threshold by perception measurement within the pre-determined duration, determining, by the first node, that the sending power is a preset first sending power; and in the case that the energy of the first channel transmitting the data is greater than the pre-determined threshold by perception measurement within the pre-determined duration, determining, by the first node, that the sending power is a second sending power, wherein the second sending power is less than the first sending power.

In the embodiments of the present application, the processing, by the first node, the data according to the perception measurement result includes: in the case that an energy of the first channel transmitting the data is greater than a pre-determined threshold by perception measurement within the pre-determined duration, waiting, by the first node, for rescheduling, or performing, by the first node, random backoff, or sending, by the first node, the data through a second channel.

In the embodiments of the present application, the sending, by the first node, the data through the sending power includes: directly sending, by the first node, the data through the sending power; and sending, by the first node, an identification firstly through the sending power, and then sending the data, wherein the identification is used for indicating at least one of the following information: the first channel transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

In the embodiments of the present application, the identification includes: a perception signal or a sequence, wherein the perception signal includes an occupying signal, the sequence includes a preamble sequence or a pilot sequence, and the perception signal or the sequence carries channel occupation information.

In the embodiments of the present application, the sending, by the first node, the data through the second sending power includes: in the case of no scheduling when sending uplink data, adjusting, by the first node, the sending power by an open-loop power control manner to acquire the second sending power, and sending the data through the second sending power, wherein the second sending power is less than the first sending power; in the case of scheduling when sending uplink data, selecting, by the first node, the smaller of two power control coefficients pre-allocated at a network side to adjust the sending power to acquire the second sending power, and sending the data through the second sending power, wherein the second sending power is less than the first sending power; and when sending downlink data, adjusting, by the first node, the power control coefficients to acquire the second sending power, and sending the data through the second sending power, wherein the second sending power is less than the first sending power.

In the embodiments of the present application, in the case that the energy of the first channel transmitting the data is greater than the pre-determined threshold by perception measurement within the pre-determined duration, the method further includes: detecting, by the first node, an identification transmitted by the first channel, identifying and selecting different codebooks or spreading codes to send the data in the first channel; and notifying, by the first node, another node to perform the perception measurement on the first channel.

In the embodiments of the present application, in the case of no scheduling, the performing the perception measurement on the first channel transmitting the data within the pre-determined duration includes: acquiring a time-frequency resource of the first channel according to the perception measurement performed on the first channel transmitting the data; and determining at least one of the following information through the time-frequency resource: a preamble sequence; a pilot sequence; a codebook; a frequency hopping pattern; a power; a Modulation and Coding Scheme MCS; and a Transmission Block Size TBS.

In the embodiments of the present application, when the first node performs the perception measurement on the first channel transmitting the data, a second node performs a perception measurement on a channel transmitting data to be sent by the second node; the second node acquires a second perception measurement result of the perception measurement; and the second node processes the data according to the second perception measurement result.

In the embodiments of the present application, a structure of a frame transmitting the data includes one of the following: a pre-determined duration region, a region for sending downlink control information, a pre-determined duration region for uplink and downlink switching, and an uplink region for sending, wherein the pre-determined duration region is used for storing the pre-determined duration, the pre-determined duration is used for the first node to perform the perception measurement before sending the data, the pre-determined duration region is located at the beginning of a subframe of the frame, or, at the beginning of a time slot in which the frame is located, or, between a downlink control information region and the uplink region for sending, and the uplink region comprises an uplink control region and an uplink data region; the pre-determined duration region, the region for sending downlink control information, a first pre-determined duration region for uplink and downlink switching, an uplink region for sending, and a downlink region for sending, wherein the pre-determined duration region is used for storing the pre-determined duration, the pre-determined duration is used for the first node to perform the perception measurement before sending the data, the pre-determined duration region is located at the beginning of the subframe of the frame, or, at the beginning of the time slot in which the frame is located, or, between the downlink control information region and the uplink region for sending, the downlink region includes a downlink control region and a downlink data region, and a second pre-determined duration region for uplink and downlink switching is stored at the end of the subframe of the frame or the time slot in which the frame is located; the pre-determined duration region, and a region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located; and the pre-determined duration region, an identification sequence, and the region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located.

In the embodiments of the present application, in the case that the energy of the first channel transmitting the data is greater than the pre-determined threshold by perception measurement within the pre-determined duration, the method includes: judging, by the first node, whether a number of times that the energy of the first channel transmitting the data is greater than the pre-determined threshold by perception measurement reaches a pre-determined threshold; if a judgment result is yes, adjusting, by the first node, the sending power for sending the data; and if the judgment result is no, performing, by the first node, random backoff and continuing to perform the perception measurement on the first channel transmitting the data.

In the embodiments of the present application, after the judging, by the first node, whether the number of times that the energy of the first channel transmitting the data is greater than the pre-determined threshold by perception measurement reaches the pre-determined threshold, the method further includes: when the first node judges that the number of times reaching the pre-determined threshold reaches a preset number of times, transmitting the data by a scheduled access manner; or, when a number of Negative Acknowledgement Signaling NACK received by the first node reaches a preset value, transmitting the data by a scheduled access manner.

In the embodiments of the present application, before performing the perception measurement on the first channel transmitting the data within the pre-determined duration, the method further includes: determining, by the first node and a node of a neighboring cell through interaction, that a first pre-determined number of subframes are all uplink subframes in a cell corresponding to the first node and the neighboring cell, and a second pre-determined number of subframes are all downlink subframes in the cell corresponding to the first node and the neighboring cell.

In the embodiments of the present application, at least one of the preamble sequence, the pilot sequence, the codebook, and the frequency hopping pattern is corresponding to a terminal identification ID.

According to another embodiment of the present disclosure, there is provided a node, including: a perception measurement module configured to, before sending data, perform a perception measurement on a first channel transmitting the data within a pre-determined duration; an acquisition module configured to acquire a first perception measurement result of the perception measurement; and a processing module configured to process the data according to the first perception measurement result.

In the embodiments of the present application, the node is notified of the pre-determined duration through one of the following manners: notifying the node of the pre-determined duration through a dynamic physical layer signaling indication; notifying the node of the pre-determined duration through a high-layer signaling semi-static configuration manner; notifying the node of the pre-determined duration through a multicast signaling or a system message; and notifying the node of the pre-determined duration through a predefined manner. In the embodiments of the present application, the pre-determined duration is set according to a Quality of Service QoS or a grade of service corresponding to the data.

In the embodiments of the present application, the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled by the downlink control information in the frame, or filling the pre-determined duration between the region for sending downlink control information and a downlink service data region scheduled by the downlink control information in the frame; and filling the pre-determined duration at the beginning or end of a time slot in which the frame is located.

In the embodiments of the present application, the processing module is further configured to determine a sending power for sending the data according to the perception measurement result; and send the data through the sending power.

In the embodiment of the present application, the processing module is further configured to, in the case that an energy of the first channel transmitting the data is less than or equal to a pre-determined threshold by perception measurement within the pre-determined duration, determine that the sending power is a preset first sending power; and in the case that the energy of the first channel transmitting the data is greater than the pre-determined threshold by perception measurement within the pre-determined duration, determine that the sending power is a second sending power, wherein the second sending power is less than the first sending power.

In the embodiments of the present application, the processing module is further configured to, in the case that an energy of the first channel transmitting the data is greater than a pre-determined threshold by perception measurement within the pre-determined duration, wait for rescheduling, or perform random backoff, or send the data through a second channel.

In the embodiments of the present application, the processing module is further configured to directly send the data; or, send an identification firstly, and then send the data, wherein the identification is used for indicating at least one of the following information: the first channel transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

In the embodiments of the present application, the identification includes: a perception signal or a sequence, wherein the perception signal includes an occupying signal, the sequence includes a preamble sequence or a pilot sequence, and the perception signal or the sequence carries channel occupation information.

In the embodiments of the present application, the processing module is further configured to, in the case of no scheduling when sending uplink data, adjust the sending power by an open-loop power control manner to acquire the second sending power, and send the data through the second sending power, wherein the second sending power is less than the first sending power; in the case of scheduling when sending uplink data, select the smaller of two power control coefficients pre-allocated at a network side to adjust the sending power to acquire the second sending power, and send the data through the second sending power, wherein the second sending power is less than the first sending power: and when sending downlink data, adjust the power control coefficients to acquire the second sending power, and send the data through the second sending power, wherein the second sending power is less than the first sending power.

In the embodiments of the present application, the processing module is further configured to detect an identification transmitted by the first channel, identify and select different codebooks or spreading codes to send the data in the first channel; and notify another node to perform the perception measurement on the first channel.

In the embodiments of the present application, in the case of no scheduling, the performing the perception measurement on the first channel transmitting the data within the pre-determined duration includes; acquiring a time-frequency resource of the first channel according to the perception measurement performed on the first channel transmitting the data; and determining at least one of the following information through the time-frequency resource: a preamble sequence; a pilot sequence; a codebook; a frequency hopping pattern; a power; a Modulation and Coding Scheme MCS; and a Transmission Block Size TBS.

In the embodiments of the present application, when the perception measurement module performs the perception measurement on the first channel transmitting the data, a second node performs a perception measurement on a channel transmitting data to be sent by the second node; the second node acquires a second perception measurement result of the perception measurement; and the second node processes the data according to the second perception measurement result.

In the embodiments of the present application, a structure of a frame transmitting the data includes one of the following: a pre-determined duration region, a region for sending downlink control information, a pre-determined duration region for uplink and downlink switching, and an uplink region for sending, wherein the pre-determined duration region is used for storing the pre-determined duration, the pre-determined duration is used for the node to perform the perception measurement before sending the data, the pre-determined duration region is located at the beginning of a subframe of the frame, or, at the beginning of a time slot in which the frame is located, or, between a downlink control information region and the uplink region for sending, and the uplink region includes an uplink control region and an uplink data region; the pre-determined duration region, the region for sending downlink control information, a first pre-determined duration region for uplink and downlink switching, an uplink region for sending, and a downlink region for sending, wherein the pre-determined duration region is used for storing the pre-determined duration, the pre-determined duration is used for the node to perform the perception measurement before sending the data, the pre-determined duration region is located at the beginning of the subframe of the frame, or, at the beginning of the time slot in which the frame is located, or, between the downlink control information region and the uplink region for sending, the downlink region includes a downlink control region and a downlink data region, and a second pre-determined duration region for uplink and downlink switching is stored at the end of the subframe of the frame or the time slot; the pre-determined duration region, and a region for sending uplink data, wherein the pre-determined duration region is used for storing the pre-determined duration, the pre-determined duration is used for the node to perform the perception measurement before sending the data, and the pre-determined duration region is located at the beginning of the subframe of the frame, or, at the beginning of the time slot in which the frame is located; and the pre-determined duration region, an identification sequence, and the region for sending uplink data, wherein the pre-determined duration region is used for storing the pre-determined duration, the pre-determined duration is used for the node to perform the perception measurement before sending the data, and the pre-determined duration region is located at the beginning of the subframe of the frame, or, at the beginning of the time slot in which the frame is located.

In the embodiment of the present application, the processing module is further configured to judge whether a number of times that the energy of the first channel transmitting the data is greater than the pre-determined threshold by continuous perception measurements reaches a pre-determined threshold; if a judgment result is yes, adjust the sending power for sending the data; and if the judgment result is no, perform random backoff and continue to perform the perception measurement on the first channel transmitting the data.

In the embodiments of the present application, the processing module is further configured to, after judging whether the number of times that the energy of the first channel transmitting the data is greater than the pre-determined threshold by continuous perception measurements reaches the pre-determined threshold, when judging that the number of times reaching the pre-determined threshold reaches a preset number of times, transmit the data by a scheduled access manner; or, when a number of Negative Acknowledgement Signaling NACK received reaches a preset value, transmit the data by a scheduled access manner.

In the embodiments of the present application, the node further includes: a determination module configured to determine, with a node of a neighboring cell through interaction, that a first pre-determined number of subframes are all uplink subframes in a cell corresponding to the node and the neighboring cell, and a second pre-determined number of subframes are all downlink subframes in the cell corresponding to the node and the neighboring cell.

In the embodiments of the present application, at least one of the preamble sequence, the pilot sequence, the codebook, and the frequency hopping pattern is corresponding to a terminal identification ID.

According to another embodiment of the present disclosure, there is provided a terminal, including: a processor configured to, before sending data, perform a perception measurement on a first channel transmitting the data within a pre-determined duration; the processor being further configured to acquire a first perception measurement result of the perception measurement; and a transmitting device configured to process the data according to the first perception measurement result.

In the embodiments of the present application, the terminal is notified of the pre-determined duration through one of the following manners: notifying the terminal of the pre-determined duration through a dynamic physical layer signaling indication, notifying the terminal of the pre-determined duration through a high-layer signaling semi-static configuration manner; notifying the terminal of the pre-determined duration through a multicast signaling or a system message; and notifying the terminal of the pre-determined duration through a predefined manner.

In the embodiments of the present application, the pre-determined duration is set according to a Quality of Service QoS or a grade of service corresponding to the data.

In the embodiments of the present application, the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled by the downlink control information in the frame, or filling the pre-determined duration between the region for sending downlink control information and a downlink service data region scheduled by the downlink control information in the frame; and filling the pre-determined duration at the beginning or end of a time slot in which the frame is located.

In the embodiments of the present application, the processor is further configured to determine a sending power for sending the data according to the perception measurement result; and the transmitting device is further configured to send the data through the sending power.

In the embodiment of the present application, the processor is further configured to, in the case that an energy of the first channel transmitting the data is less than or equal to a pre-determined threshold by perception measurement within the pre-determined duration, determine that the sending power is a preset first sending power; and in the case that the energy of the first channel transmitting the data is greater than the pre-determined threshold by perception measurement within the pre-determined duration, determine that the sending power is a second sending power, wherein the second sending power is less than the first sending power.

In the embodiments of the present application, the processor is further configured to, in the case that an energy of the first channel transmitting the data is greater than a pre-determined threshold by perception measurement within the pre-determined duration, wait for rescheduling, or perform random backoff, or send the data through a second channel.

In the embodiments of the present application, the transmitting device is further configured to directly send the data; or, send an identification firstly, and then send the data, wherein the identification is used for indicating at least one of the following information: the first channel transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

In the embodiments of the present application, the identification includes: a perception signal or a sequence, wherein the perception signal includes an occupying signal, the sequence includes a preamble sequence or a pilot sequence, and the perception signal or the sequence carries channel occupation information.

In the embodiments of the present application, the processor is further configured to, in the case of no scheduling when sending uplink data, adjust the sending power by an open-loop power control manner to acquire the second sending power, and send the data through the second sending power, wherein the second sending power is less than the first sending power; in the case of scheduling when sending uplink data, select the smaller of two power control coefficients pre-allocated at a network side to adjust the sending power to acquire the second sending power, and send the data through the second sending power, wherein the second sending power is less than the first sending power; and when sending downlink data, adjust the power control coefficients to acquire the second sending power, and send the data through the second sending power, wherein the second sending power is less than the first sending power.

In the embodiments of the present application, when the processor performs the perception measurement on the first channel transmitting the data, a base station performs a perception measurement on a channel transmitting data to be sent by the base station; the base station acquires a second perception measurement result of the perception measurement; and the base station processes the data according to the second perception measurement result.

In the embodiments of the present application, the processor is further configured to, in the case that the energy of the first channel transmitting the data is greater than the pre-determined threshold by perception measurement within the pre-determined duration, judge whether a number of times that the energy of the first channel transmitting the data is greater than the pre-determined threshold by perception measurement reaches a pre-determined threshold; if a judgment result is yes, adjust the sending power for sending the data; and if the judgment result is no, perform random backoff and continue to perform the perception measurement on the first channel transmitting the data.

In the embodiments of the present application, the processor is further configured to, after judging whether the number of times that the energy of the first channel transmitting the data is greater than the pre-determined threshold by continuous perception measurements reaches the pre-determined threshold, when judging that the number of times reaching the pre-determined threshold reaches a preset number of times, transmit the data by a scheduled access manner; or, when a number of Negative Acknowledgement Signaling NACK received reaches a preset value, transmit the data by a scheduled access manner.

In the embodiments of the present application, the terminal further includes: the processor being further configured to determine, with a node of a neighboring cell through interaction, that a first pre-determined number of subframes are all uplink subframes in a cell corresponding to the terminal and the neighboring cell, and a second pre-determined number of subframes are all downlink subframes in the cell corresponding to the terminal and the neighboring cell.

According to another embodiment of the present application, there is also provided a storage medium. The storage medium is configured to store program codes for executing the following steps: before sending data, performing, by a first node, a perception measurement on a first channel transmitting the data within a pre-determined duration; acquiring, by the first node, a first perception measurement result of the perception measurement; and processing, by the first node, the data according to the first perception measurement result.

In the embodiments of the present application, the storage medium is further configured to store program codes for executing the following steps, wherein the first node is notified of the pre-determined duration through one of the following manners: notifying the first node of the pre-determined duration through a dynamic physical layer signaling indication; notifying the first node of the pre-determined duration through a high-layer signaling semi-static configuration; notifying the first node of the pre-determined duration through a multicast signaling or a system message; and notifying the first node of the pre-determined duration through a predefined manner.

In the embodiments of the present application, the storage medium is further configured to store program codes for executing the following step, wherein the pre-determined duration is set according to a Quality of Service QoS or a grade of service corresponding to the data.

In the embodiments of the present application, the storage medium is further configured to store program codes for executing the following step, wherein the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled in the frame, or filling the pre-determined duration between the region for sending downlink control information and a downlink service data region scheduled in the frame; and filling the pre-determined duration at the beginning or end of a time slot in which the frame is located.

In the embodiments of the present application, the storage medium is further configured to store program codes for executing the following step, wherein the processing, by the first node, the data according to the first perception measurement result includes: determining, by the first node, a sending power for sending the data according to the perception measurement result; and sending, by the first node, the data through the sending power.

In the embodiments of the present application, the storage medium is further configured to store program codes for executing the following step, wherein the determining, by the first node, the sending power for sending the data according to the first perception measurement result includes: In the embodiments of the present application, the storage medium is further configured to store program codes for executing the following step, wherein the processing, by the first node, the data according to the perception measurement result includes: in the case that an energy of the first channel transmitting the data is greater than a pre-determined threshold by perception measurement within the pre-determined duration, waiting, by the first node, for rescheduling, or performing, by the first node, random backoff, or sending, by the first node, the data through a second channel.

In the embodiments of the present application, the storage medium is further configured to store program codes for executing the following step, wherein the sending, by the first node, the data through the sending power includes: directly sending, by the first node, the data through the sending power; and sending, by the first node, an identification firstly through the sending power, and then sending the data, wherein the identification is used for indicating at least one of the following information: the first channel transmitting the data being occupied; a modulation and coding grade for transmitting data: a codebook or spreading code for transmitting data; a beam for transmitting data; a time domain pattern for transmitting data; a frequency domain pattern for transmitting data; and a time domain pattern and a frequency domain pattern for transmitting data.

In the embodiments of the present application, the storage medium is further configured to store program codes for executing the following step, wherein the identification includes a perception signal or a sequence, wherein the perception signal includes an occupying signal, the sequence includes a preamble sequence or a pilot sequence, and the perception signal or the sequence carries channel occupation information.

In the embodiments of the present application, the storage medium is further configured to store program codes for executing the following step, wherein the sending, by the first node, the data through the sending power includes: in the case of no scheduling when sending uplink data, adjusting, by the first node, the sending power by an open-loop power control manner to acquire the second sending power, and sending the data through the second sending power, wherein the second sending power is less than the first sending power; in the case of scheduling when sending uplink data, selecting, by the first node, the smaller of two power control coefficients pre-allocated at a network side to adjust the sending power to acquire the second sending power, and sending the data through the second sending power, wherein the second sending power is less than the first sending power; and when sending downlink data, adjusting, by the first node, the power control coefficients to acquire the second sending power, and sending the data through the second sending power, wherein the second sending power is less than the first sending power.

In the embodiments of the present application, the storage medium is further configured to store program codes for executing the following step, wherein in the case that the energy of the first channel transmitting the data is greater than the pre-determined threshold by perception measurement within the pre-determined duration, the first node detects an identification transmitted by the first channel, identifies and selects different codebooks or spreading codes to send the data in the first channel; and the first node notifies another node to perform the perception measurement on the first channel.

In the embodiments of the present application, the storage medium is further configured to store program codes for executing the following step, wherein in the case of no scheduling, the performing the perception measurement on the first channel transmitting the data within the pre-determined duration includes: acquiring a time-frequency resource of the first channel according to the perception measurement performed on the first channel transmitting the data; and determining at least one of the following information through the time-frequency resource: a preamble sequence; a pilot sequence; a codebook; a frequency hopping pattern; a power; a Modulation and Coding Scheme MCS; and a Transmission Block Size TBS.

In the embodiments of the present application, the storage medium is further configured to store program codes for executing the following step, wherein when the first node performs the perception measurement on the first channel transmitting the data, a second node performs a perception measurement on a channel transmitting data to be sent by the second node; the second node acquires a second perception measurement result of the perception measurement; and the second node processes the data according to the second perception measurement result.

In the embodiments of the present application, the storage medium is further configured to store program codes for executing the following step, wherein a structure of a frame transmitting the data includes at least one of the following: a pre-determined duration region, a region for sending downlink control information, a pre-determined duration region for uplink and downlink switching, and an uplink region for sending, wherein the pre-determined duration region is used for storing the pre-determined duration, the pre-determined duration is used for the first node to perform the perception measurement before sending the data, the pre-determined duration region is located at the beginning of a subframe of the frame, or, at the beginning of a time slot in which the frame is located, or, between a downlink control information region and the uplink region for sending, and the uplink region includes an uplink control region and an uplink data region; the pre-determined duration region, the region for sending downlink control information, a first pre-determined duration region for uplink and downlink switching, an uplink region for sending, and a downlink region for sending, wherein the pre-determined duration region is used for storing the pre-determined duration, the pre-determined duration is used for the first node to perform the perception measurement before sending the data, the pre-determined duration region is located at the beginning of the subframe of the frame, or, at the beginning of the time slot in which the frame is located, or, between the downlink control information region and the uplink region for sending, the downlink region includes a downlink control region and a downlink data region, and a second pre-determined duration region for uplink and downlink switching is stored at the end of the subframe of the frame or the time slot in which the frame is located; the pre-determined duration region, and a region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located; and the pre-determined duration region, an identification sequence, and the region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located.

In the embodiments of the present application, the storage medium is further configured to store program codes for executing the following step, wherein in the case that the energy of the first channel transmitting the data is greater than the pre-determined threshold by perception measurement within the pre-determined duration, the first node judges whether a number of times that the energy of the first channel transmitting the data is greater than the pre-determined threshold by perception measurement reaches a pre-determined threshold; if a judgment result is yes, the first node adjusts the sending power for sending the data; and if the judgment result is no, the first node performs, random backoff and continues to perform the perception measurement on the first channel transmitting the data.

In the embodiments of the present application, the storage medium is further configured to store program codes for executing the following step, wherein after the first node judges whether the number of times that the energy of the first channel transmitting the data is greater than the pre-determined threshold by perception measurement reaches the pre-determined threshold, when the first node judges that the number of times reaching the pre-determined threshold reaches a preset number of times, the data is transmitted by a scheduled access manner; or, when a number of Negative Acknowledgement Signaling NACK received by the first node reaches a preset value, the data is transmitted by a scheduled access manner.

In the embodiments of the present application, the storage medium is further configured to store program codes for executing the following step, wherein before performing the perception measurement on the first channel transmitting the data within the pre-determined duration, the first node and a node of a neighboring cell determine through interaction, that a first pre-determined number of subframes are all uplink subframes in a cell corresponding to the first node and the neighboring cell, and a second pre-determined number of subframes are all downlink subframes in the cell corresponding to the first node and the neighboring cell.

In the embodiments of the present application, the storage medium is further configured to store program codes for executing the following step, wherein at least one of the preamble sequence, the pilot sequence, the codebook, and the frequency hopping pattern is corresponding to a terminal identification ID.

Through the embodiments of the present application, before sending data, the first node performs the perception measurement on the first channel transmitting the data within the pre-determined duration; the first node acquires the perception measurement result of the perception measurement; and the first node processes the data according to the perception measurement result. Since the perception measurement is carried out on the channel transmitting data before the node transmits data, the node can know the state of the channel transmitting data according to the perception measurement results and process the data according to the state of the channel. Therefore, the problems of interference and resource collision between uplink and downlink data transmissions in neighboring cells or in the local cell in the related art can be solved, and the embodiments of the present application can be used for licensed spectrums, shared spectrums and unlicensed spectrums, which reduce the delay caused by the retransmission reduction due to the resource collision between terminal UEs under scheduling-free access in general on one hand, and reduce the neighboring cell interference problem caused by flexible TDD and the uplink and downlink interference problem under full duplex in the local cell, and improve the robustness of data transmission and the system performances.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings illustrated herein serve to provide a further understanding of the application and constitute a part of the present application, and the illustrative embodiments of the present application and together with the description thereof serve to explain the present application, and do not constitute inappropriate definition to the present application. In the drawings.

DETAILED DESCRIPTION

The present application will be explained in detail with reference to the accompanying drawings and embodiments hereinafter. It should be noted that, in case of no conflict, the embodiments in the present application and the features in the embodiments may be combined with each other.

It should be noted that the terms "first", "second" and the like in the description and claims of the invention as well as the above drawings are used to distinguish similar objects, and are not necessarily used to describe a specific sequence or a chronological order.

First Embodiment

Figure 1:
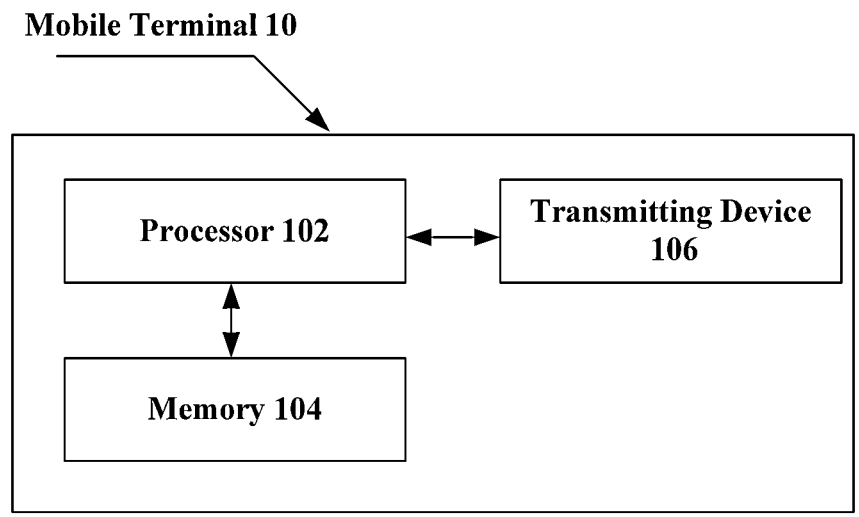
FIG. 1 is a block diagram illustrating a hardware structure of a mobile terminal of a data processing method according to an embodiment of the present application.

The method embodiment provided in the first embodiment of the present application may be executed in a mobile terminal, a computer terminal or similar computing device. The embodiment is described as an example of operating on a mobile terminal. FIG. 1 is a block diagram illustrating a hardware structure of a mobile terminal of a data processing method according to an embodiment of the present application. As shown in FIG. 1, a mobile terminal 10 may include one or more (only one is shown in the figure) processor 102 (the processor 102 may include, but is not limited to, a processing apparatus such as a Microprocessor MCU or a Programmable Logic Device FPGA), a memory 104 for storing data, and a transmitting device 106 for communication functions. Those of ordinary skills in the art will understand that the structure as shown in FIG. 1 is only schematic, and does not limit the structure of the electronic device described above. For example, the mobile terminal 10 may also include more or fewer components than that shown in FIG. 1, or have different configurations than that shown in FIG. 1.

The memory 104 may be configured to store software programs and modules of application software, such as program instructions/modules corresponding to the data method method in the embodiment of the present application. The processor 102 executes various functional applications and data processing by running the software programs and modules stored in the memory 104, i.e., implements the above method. The memory 104 may include a high-speed random memory and may also include a non-volatile memory such as one or more magnetic storage devices, flash memory, or other non-volatile solid-state memory. In some examples, the memory 104 may further include a memory remotely disposed with respect to the processor 142, which may be connected to the mobile terminal 10 through a network. Examples of the above networks include, but are not limited to, the Internet, enterprise intranets, local area networks, mobile communication networks, and combinations thereof.

The transmitting device 106 is configured to receive or transmit data via a network. The specific example of the network described above may include a wireless network provided by a communication provider of the mobile terminal 10. In one example, the transmitting device 106 includes a Network Interface Controller (NIC) that can be connected to other network devices through a base station so as to be able to communicate with the Internet. In one example, the transmitting device 106 may be a Radio Frequency (RF) module configured to communicate with the Internet wirelessly.

Figure 2:
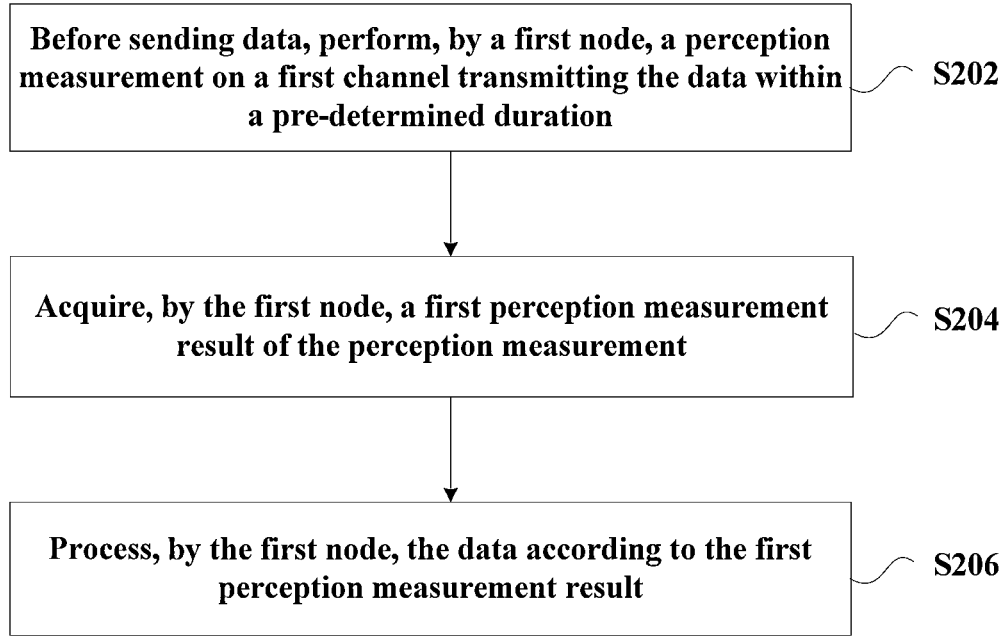
FIG. 2 is a flow chart of the data processing method according to the embodiment of the present application.

In the embodiment, there is provided a data processing method running in the above-mentioned mobile terminal. FIG. 2 is a flow chart of the data processing method according to the embodiment of the present application. As shown in FIG. 2, the flow includes the following steps:

step S202: before sending data, performing, by a first node, a perception measurement on a first channel transmitting the data within a pre-determined duration;

step S204: acquiring, by the first node, a first perception measurement result of the perception measurement; and step S206: processing, by the first node, the data according to the first perception measurement result.

Through the above-mentioned steps, since the perception measurement is carried out on the channel transmitting data before the node sends data, the node can know the state of the channel transmitting data according to the perception measurement results and process the data according to the state of the channel. Therefore, the problems of interference and resource collision among neighboring cells or between uplink and downlink data transmissions in the related art can be solved, and the embodiments of the present application can be used for licensed spectrums, shared spectrums and unlicensed spectrums, which reduce the delay caused by the retransmission reduction due to the resource collision between terminal UEs under scheduling-free access in general on one hand, and reduce the neighboring cell interference problem caused by flexible TDD and the uplink and downlink interference problem under full duplex in the local cell, and improve the robustness of data transmission and the system performances.

Optionally, the first node is notified of the pre-determined duration through one of the following manners: notifying the first node of the pre-determined duration through a dynamic physical layer signaling indication; notifying the first node of the pre-determined duration through a high-layer signaling semi-static configuration manner; notifying the first node of the pre-determined duration through a multicast signaling or a system message; and notifying the first node of the pre-determined duration through a predefined manner.

Optionally, the pre-determined duration is set according to a Quality of Service QoS or a grade of service corresponding to the data.

For example, a field Gap (the same as the above-mentioned pre-determined duration) is introduced into the frame structure that can transmit data to indicate the duration of the perception measurement performed before the node sends the data, and perceive and monitor whether CTS or occupying signals sent by other nodes exit, so as to reduce the interference caused by flexible TDD and full duplex and the problem of resource collision between terminals without scheduling. For another example, a Gap with a high QoS has a small length and a Gap with a low QoS has a long length.

For another example, nodes corresponding to services with a high QoS firstly perform a perception measurement, and then send occupying signals or directly send the data after the perception measurement is successful. Then other services with low priority can perceive and measure the occupying signals, such as preamble signals, sent by the nodes with high priority to determine the power of the following data or whether the data can be sent.

Optionally, the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled by the downlink control information in the frame, or filling the pre-determined duration between the region for sending downlink control information and a downlink service data region scheduled by the downlink control information in the frame; and filling the pre-determined duration at the beginning or end of a time slot in which the frame is located, for example, the time slot includes a Mini-slot.

Optionally, the processing, by the first node, the data according to the first perception measurement result includes: determining, by the first node, a sending power for sending the data according to the perception measurement result; and sending, by the first node, the data through the sending power.

Optionally, the determining, by the first node, the sending power for sending the data according to the first perception measurement result includes: in the case that an energy of the first channel transmitting the data is less than or equal to a pre-determined threshold by perception measurement within the pre-determined duration, determining, by the first node, that the sending power is a preset first sending power; and in the case that the energy of the first channel transmitting the data is greater than the pre-determined threshold by perception measurement within the pre-determined duration, determining, by the first node, that the sending power is a second sending power, wherein the second sending power is less than the first sending power.

Optionally, the processing, by the first node, the data according to the perception measurement result includes: in the case that an energy of the first channel transmitting the data is greater than a pre-determined threshold by perception measurement within the pre-determined duration, waiting, by the first node, for rescheduling, or performing random backoff, or sending, by the first node, the data through a second channel, wherein when the first node performs random backoff, i.e., the first node detects that the energy of the first channel is great, time for sending the data is selected randomly after the detection time. Optionally, the first node may also send the data through a second beam, wherein the second beam is different from a beam used by the first channel when the energy of the first channel transmitting the data is less than the pre-determined threshold by perception measurement, or the first node sends the data through a second modulation and coding manner, wherein the second modulation and coding manner is different from a coding manner used by the first channel when the energy of the first channel transmitting the data is less than the pre-determined threshold by perception measurement.

Through the above steps, the data processing manner can be determined more directly and quickly according to the energy of the channel transmitting the data by perception measurement.

Optionally, the energy of the channel is the energy of the signal corresponding to all data of a transmission state in the channel.

Optionally, the sending, by the first node, the data through the sending power includes: directly sending, by the first node, the data through the sending power; and sending, by the first node, an identification firstly through the sending power, and then sending the data, wherein the identification is used for indicating at least one of the following information: the first channel transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

Optionally, the identification includes: a perception signal or a sequence, wherein the perception signal includes an occupying signal which further includes a beacon signal and a Clear to Send (CTS) signal respect to an unlicensed carrier, and the perception signal or the sequence carries channel occupation information. The sequence includes a preamble or pilot sequence.

Optionally, the sending, by the first node, the data through the second sending power includes: in the case of no scheduling when sending uplink data, adjusting, by the first node, the sending power by an open-loop power control manner to acquire the second sending power, and sending the data through the second sending power, wherein the second sending power is less than the first sending power; in the case of scheduling when sending uplink data, selecting, by the first node, the smaller of two power control coefficients pre-allocated at a network side to adjust the sending power to acquire the second sending power, and sending the data through the second sending power, wherein the second sending power is less than the first sending power; and when sending downlink data, adjusting, by the first node, the power control coefficients to acquire the second sending power, and sending the data through the second sending power, wherein the second sending power is less than the first sending power. Optionally, when the first node perceives that the energy of the channel transmitting the data is less than the pre-determined threshold, the first node adjusts to send the data by a larger power.

Optionally, in the case that the energy of the channel transmitting the data is greater than the pre-determined threshold by perception measurement within the pre-determined duration, the first node detects an identification transmitted by the first channel, identifies and selects different codebooks or spreading codes to send the data in the first channel; and the first node notifies another node to perform the perception measurement on the first channel.

Optionally, the performing the perception measurement on the channel transmitting the data within the pre-determined duration includes one of the following: detecting an energy of the entire system bandwidth within the pre-determined duration; and only detecting an energy at a frequency domain position of the data to be sent.

Optionally, in the case of no scheduling, the performing the perception measurement on the first channel transmitting the data within the pre-determined duration includes: acquiring a time-frequency resource of the first channel according to the perception measurement performed on the first channel transmitting the data; and determining at least one of the following information through the time-frequency resource: a preamble sequence; a pilot sequence; a codebook; a frequency hopping pattern; a power; a Modulation and Coding Scheme (MCS); and a Transmission Block Size (TBS).

Optionally, when the first node performs the perception measurement on the first channel transmitting the data, a second node performs a perception measurement on a channel transmitting data to be sent by the second node; the second node acquires a second perception measurement result of the perception measurement; and the second node processes the data according to the second perception measurement result. Through the above steps, the perception measurement processes among the nodes do not interfere with each other, and each node can process the data thereof according to the measurement result thereof.

Figure 3:
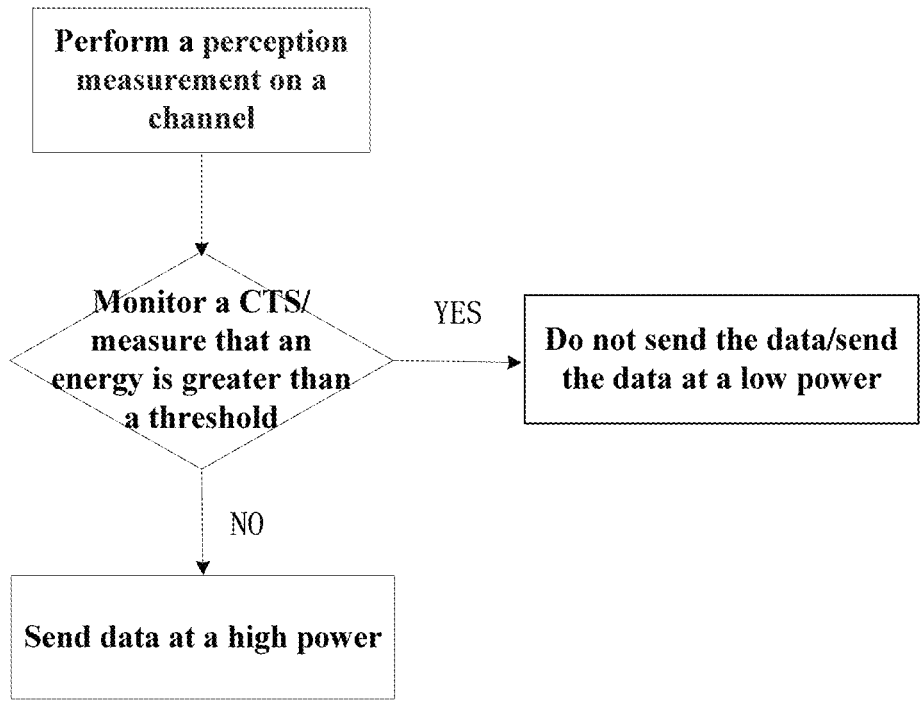
FIG. 3 is a schematic diagram illustrating a data processing method using a mechanism similar to RTS/CTS according to an embodiment of the present application.

For example, FIG. 3 is a schematic diagram of a data processing method using a mechanism similar to Request to Send/Clear to Send (RTS/CTS) according to the embodiment of the present application. As shown in FIG. 3:

First, a base station 1 of a cell 1 sends Downlink Control Information (DCI) at an initial position of a subframe to trigger the sending of following uplink data, performs perceptual detection within a pre-determined Gap, and sends a broadcast signal, such as a signal similar to CTS, when a signal energy detected is lower than a pre-determined threshold. The signal carries occupancy information of following consecutive subframes. Then, a UE for scheduling can send uplink scheduled data after detecting the signal.

It is assumed that a priority of a scheduled uplink service is higher than a downlink service scheduled by a cell 2. Then a base station of the cell 2 performs signal perception in a Gap longer than the cell 1 before sending downlink data, and then monitors a CTS signal sent by the base station 1 in the Gap. If the CTS signal is monitored, then the signal can be sent at a pre-determined power later. If the CTS signal is monitored, then a transmission power of the data needs to be adjusted, and the data is sent at a smaller power, or the downlink data is not sent, or the sending of the uplink data is triggered.

For another example, as shown in FIG. 3, after the base station of the cell 2 sends the DCI and the CTS to the UE, the UE reports an interference level to a receiving end of the base station according to a Signal-Noise Ratio (SNR) of the CTS signal received, and then the base station adjusts the power of the subsequent downlink data according to the interference level. For example, downlink nodes dynamically measure and perceive signals, and dynamically adjust or determine downlink power control coefficients according to an instantaneous interference level. Nodes scheduled for uplink dynamically measure and perceive signals, and determine uplink power control coefficients according to an instantaneous interference level. For the terminals without scheduled access, before sending data, if the perceived signal energy threshold is less than or equal to the threshold, then data or preamble and data sending are performed; if the perceived signal energy threshold is greater than the threshold, then random backoff is performed, and perception is performed in next moment.

Optionally, a structure of a frame transmitting the data includes at least one of the following: a pre-determined duration region, a region for sending downlink control information, a pre-determined duration region for uplink and downlink switching, and an uplink region for sending, wherein the pre-determined duration region is used for storing the pre-determined duration, the pre-determined duration is used for the first node to perform the perception measurement before sending the data, the pre-determined duration region is located at the beginning of a subframe of the frame, or, at the beginning of a time slot in which the frame is located, or between a downlink control information region and the uplink region for sending, and the uplink region includes an uplink control region and an uplink data region, the pre-determined duration region, the region for sending downlink control information, a first pre-determined duration region for uplink and downlink switching, an uplink region for sending, and a downlink region for sending, wherein the pre-determined duration region is used for storing the pre-determined duration, the pre-determined duration is used for the first node to perform the perception measurement before sending the data, the pre-determined duration region is located at the beginning of the subframe of the frame, or, at the beginning of the time slot in which the frame is located, or, between the downlink control information region and the uplink region for sending, the downlink region includes a downlink control region and a downlink data region, and a second pre-determined duration region for uplink and downlink switching is stored at the end of the subframe of the frame or the time slot; the pre-determined duration region, and a region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located; and the pre-determined duration region, an identification sequence, and a region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located.

Optionally, in the case that the energy of the channel transmitting the data is greater than the pre-determined threshold by perception measurement within the pre-determined duration, the first node judges whether a number of times that the energy of the channel transmitting the data is greater than the pre-determined threshold by perception measurement reaches a pre-determined threshold; if a judgment result is yes, the first node adjusts the sending power for sending the data; and if the judgment result is no, the first node performs random backoff and continues to perform the perception measurement on the channel transmitting the data.

Optionally, after the first node judges whether the number of times that the energy of the channel transmitting the data is greater than the pre-determined threshold by continuous perception measurements reaches the pre-determined threshold, when the first node judges that the number of times reaching the pre-determined threshold reaches a preset number of times, the data is transmitted by a scheduled access manner; or, when a number of Negative Acknowledgement Signaling NACK received by the first node reaches a preset value, the data is transmitted by a scheduled access manner.

Optionally, before performing the perception measurement on the channel transmitting the data within the pre-determined duration, the first node and a node of a neighboring cell determine through interaction, that a first pre-determined number of subframes are all uplink subframes in a cell corresponding to the first node and the neighboring cell, and a second pre-determined number of subframes are all downlink subframes in the cell corresponding to the first node and the neighboring cell. Through the above steps, the resource collision between the UEs under scheduling-free access in general can also be reduced, the delay caused by retransmission can be reduced, the neighboring cell interference problem caused by flexible TDD and the uplink and downlink interference problem under full duplex can be reduced, and the robustness of data transmission and the system performances can be improved.

Optionally, at least one of the preamble sequence, the pilot sequence, the codebook, and the frequency hopping pattern is corresponding to a terminal identification ID.

Figure 4:
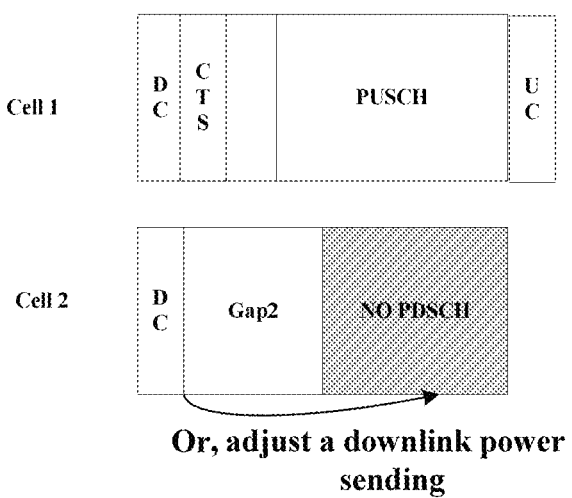
FIG. 4 is a schematic diagram illustrating a flow chart of a sending end of a perception-based data transmission method according to an embodiment of the present application.

FIG. 4 is a schematic diagram illustrating a flow chart of a sending end of a perception-based data transmission method according to an embodiment of the present application, which, as shown in FIG. 4, includes the following steps.

First, a node performs perception measurement before sending data. The perception measurement includes detecting an energy of the entire system bandwidth or only detecting an energy at a frequency domain position of the data to be sent.

Then, the node processes correspondingly according to a perception result.

When an energy of a channel transmitting the data is less than or equal to a predefined threshold within Gap time (equivalent to the above-mentioned pre-determined duration) by perception measurement, the data is sent according to a pre-determined higher power or using a larger power control coefficient, or the node sends a sequence or perception signal firstly and then sends the data. The sequence includes a preamble or pilot sequence.

The above-mentioned perception signal includes an occupying signal, and further includes a signal similar to a beacon signal and a CTS signal respect to an unlicensed carrier, and the perception signal or the sequence carries the following information: the occupancy duration or time information of the node on the channel.

After perceiving the sequence or perception signal of the node, other nodes do not need to perform a perception measurement on the channel within the indicated occupation duration.

When the perceived energy threshold of the signal is greater than the threshold, one of the following actions is taken: first action: adjusting the power control coefficients, and sending the data at a low power; second action: no longer sending the data, waiting for rescheduling or performing random backoff, and third action: sending the data on other carriers or other beams.

Figure 5:
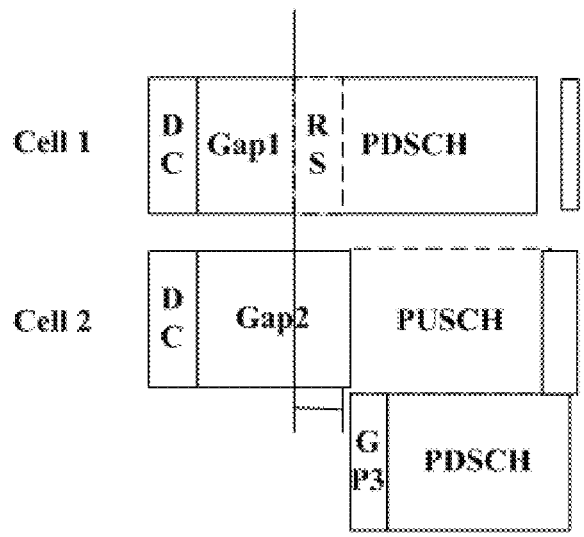
FIG. 5 is a schematic diagram illustrating a preferred flow chart of the perception-based data transmission method according to the embodiment of the present application.

The following describes the case of the data sending process. FIG. 5 is a preferred flow chart of a perception-based data transmission method according to an embodiment of the present application, which, as shown in FIG. 5, includes the following steps.

A downlink service priority of a cell 1 is high, and a cell 2 schedules uplink with low priority. When a UE perceives that an energy threshold of a carrier transmitting data is higher than a predefined threshold before sending uplink data, the UE reports the data to a base station through other carriers. The UE will no longer send the data on the carrier. For example, 1-bit information is used to indicate whether to send the data on the carrier, wherein 0 indicates to send the data, and 1 indicates not to send the data. Meanwhile, the UE prepares to receive data, and prepares to receive downlink data that may be sent by the base station.

Then, after the base station receives the information that the UE cannot send the data, the base station may perceive on the carrier and send the downlink data if the signal power measured is lower than the preset threshold.

Or, the following cases are adopted for sending the data.

Figure 6:
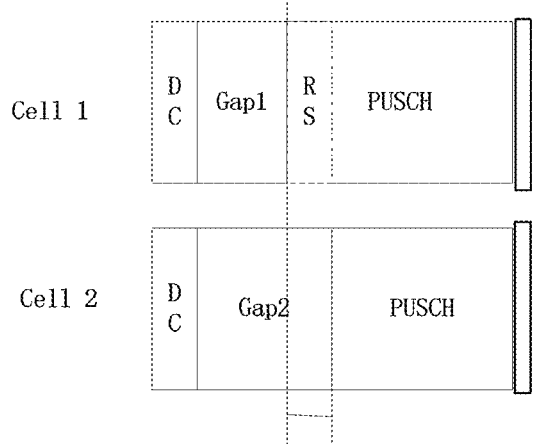
FIG. 6 is a schematic diagram illustrating data sending in neighboring cells of the perception-based data transmission method according to the embodiment of the present application.

The cell 2 pre-schedules the moment which may either be uplink or downlink, and then both the base station and the UE perform perception. Due to different geographical positions, the base station perceives that the channel is busy, so the downlink data cannot be sent. Meanwhile, it needs to be prepared to receive uplink. The UE may perceive that the threshold is less than the threshold, and then send the uplink data, as shown in FIG. 6. In this way, the nodes can send or receive the data according to the perception results thereof.

At this moment, the priorities of the scheduled uplink and downlink services are different, and collision caused by simultaneous uplink and downlink transmission can also be avoided. Therefore, uplink and downlink data can further be sent flexibly and dynamically through the above-mentioned method.

Figure 7:
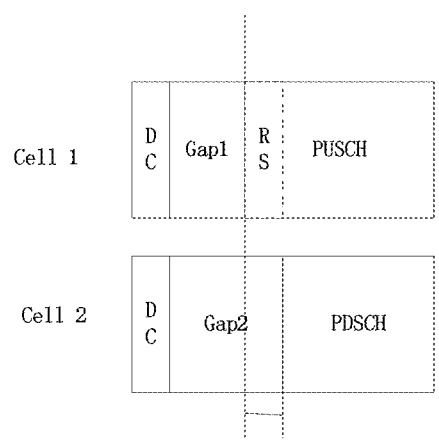
FIG. 7 is a schematic diagram illustrating data sending in neighboring cells according to the embodiment of the present application.

A description will be given to the case where neighboring cells clear to send data and coordinate interferences through perception. FIG. 7 is a schematic diagram illustrating data sending in neighboring cells according to the embodiment of the present application. As shown in FIG. 7, in a certain subframe or time slot or Mini-slot, a cell 1 is scheduled for uplink data sending, and a neighboring cell 2 is scheduled for downlink data sending. If no perception is performed according to the prior art, there will be interferences, affecting data performances.

However, in the embodiment of the present application, the following cases will occur:

It is assumed that a priority or a QoS of a scheduled uplink service is high, then a length of a corresponding Gap is short, and a scheduled UE of the cell 1 firstly performs perception detection successfully, sends a preamble or sequence or directly sends the data, and then a base station of the cell 2, after perceiving the preamble, will not send downlink data anymore or still sends the downlink data with a low power.

Or, if other frequency domain positions in the time slot are idle, the base station may transfer the data to the idle frequency domain positions for sending. Meanwhile, the frequency domain position is hidden by sending a preamble sequence. That is, the preamble sequence corresponds to the frequency domain position of the data one by one. Once detecting the preamble sequence, a terminal can know the frequency domain position of the data, and then receive and demodulate the data at the frequency domain position.

Or, the base station sends the frequency domain position sent by the data showing signaling notification changes through other carriers.

Figure 8:
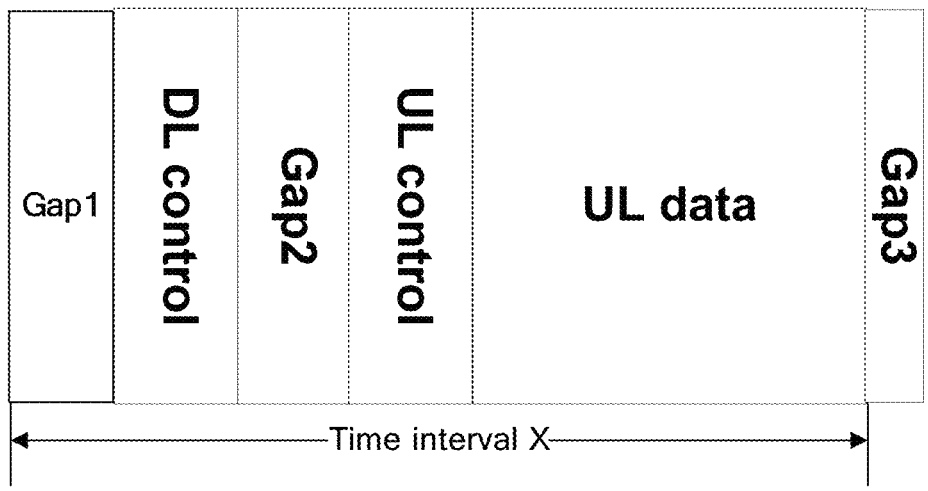
FIG. 8 is a schematic diagram illustrating a structure of a data transmission subframe according to an embodiment of the present application.

The length and the position of the Gap, and the frame structure mentioned in the embodiment of the present application will be described below. FIG. 8 is a schematic diagram illustrating a structure of a data transmission subframe according to an embodiment of the present application. As shown in FIG. 8: the length of the Gap used for perception measurement is fixed, semi-statically configured or dynamically changed, which is corresponding to the priority or QoS of the service. For example, the length of the Gap with high QoS or grade of service is short, and the length of the Gap with low QoS or grade of service is long.

The specific length is dynamically indicated by a physical layer signaling, or semi-statically configured by a high layer signaling, or a corresponding relation between different QoS or service priorities and the length of the Gap is predefined. Or, a time for a node to perform perception in the Gap is corresponding to the grade of service. The time for a perception measurement on a high-priority service is shorter, while the time for a perception measurement on a low-priority service is longer.

A specific position of the Gap includes at least one of the following:

at the beginning of a subframe;

between a downlink control channel and scheduled uplink or downlink;

at the beginning or end of a Mini-slot; and at the beginning or end of a time slot or subframe.

As shown in FIG. 8, a Gap1 for perception measurement may be located at the beginning of the subframe or time slot, followed by downlink control information, then another Gap2 for uplink and downlink switching, and then a region for sending uplink data, including an uplink control region and an uplink data region. If downlink follows, there is also a Gap3 at the end of the subframe or time slot for uplink and downlink switching.

Or the Gap1 is located at the beginning of the subframe or time slot, followed by the downlink control information, then another GAP2 for uplink and downlink switching, then the uplink data, and then the uplink control region. If downlink follows, there is also a Gap3 at the end of the subframe or time slot for uplink and downlink switching.

Figure 9:
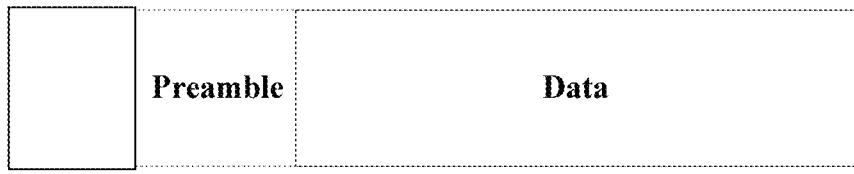
FIG. 9 is a schematic diagram illustrating a structure of a scheduling-free data transmission subframe according to an embodiment of the present application.

FIG. 9 is a structure diagram of a scheduling-free data transmission subframe according to an embodiment of the present application. The case of data transmission by a scheduling-free node will be described with reference to FIG. 9 below. For a scheduling-free UE, before sending data, if a perceived signal energy threshold is less than or equal to a threshold, then data sending is performed; if the perceived signal energy threshold is greater than the threshold, then the data is sent at a low power or random backoff is performed, and perception is performed in next moment.

Further, the perceived time-frequency resource is associated and corresponding to at least one of the following: a precursor; a pilot sequence; a codebook, a frequency hopping pattern; a power; a MCS; and a TBS.

The preamble is associated with an ID of the UE and may also be used for synchronization and channel estimation. The pilot sequence may also be used for UE identification, channel estimation and channel interference measurement. The frequency hopping pattern is that if an ACK is not received within a pre-determined timing duration after a node sends data, then the data is sent at the same frequency domain position within a pre-determined duration later, or a pre-determined frequency domain position is selected in a resource pool for data sending. The time-frequency resource or the frequency hopping pattern is known at a receiving end.

The structure of the subframe or time slot for data transmission is shown in FIG. 8. There is a Gap at the front, then there may be a preamble sequence, which is followed by the sent data. Or, the node can adjust the transmission power to send the data by itself only when a number of times that the perceived energy of the signal is greater than the threshold by continuous perception measurements reaches a threshold; otherwise, the node performs random backoff to continue perception. When a times of retransmission reaches the maximum rimes of retransmission, scheduled access is adopted.

The adjustment or determination of the data transmission power will be described below. When a station perceives that the energy of the signal is greater than a predefined threshold before sending the data, the station can still send the data with a low power. For downlink, the station can adjust the sending power by itself. The power can meet certain coverage without too strong interference to neighboring cells.

For an uplink scheduling-based UE, the base station can pre-configure two power control coefficients to the UE when sending data, one for determining its own power when perceiving a strong signal and the other for determining its own power when perceiving a weak signal. When a strong signal is perceived, the data is sent with a low power, and when a weak signal is perceived, the data is sent with a higher power.

The method can reduce the interference of neighboring cells on one hand, and does not affect the data sending thereof in the meanwhile.

Figure 10:
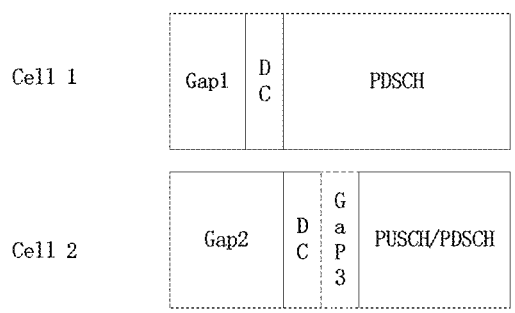
FIG. 10 is a schematic diagram illustrating a data transmission structure according to an embodiment of the present application.

FIG. 10 is a schematic diagram of a data transmission structure according to an embodiment of the present application. A process for the node to send data according to the perception result will be described hereinafter with reference to FIG. 10. A position of a Gap used for perception measurement is defined as the beginning of a subframe or time slot, and a perceived subject is a base station. Before sending downlink control information, the base station performs a perception measurement on a channel first, and then the base station determines whether to schedule uplink or downlink data later according to a perception result.

As shown in FIG. 10, a base station of a cell 1 sends downlink data firstly. Then, a base station of a neighboring cell 2 perform a perception measurement before scheduling the data.

When the base station of the cell 2 perceives that the energy threshold of the signal is less than the threshold, the base station can choose whether to schedule an uplink service or a downlink service according to loads of the uplink and downlink services. For example, if the load of the uplink service is high, the uplink service can be scheduled, and if the load of the downlink service is high, the downlink service can be scheduled.

When the base station of the cell 2 perceives that the interference is greater than the threshold, the base station schedules the downlink data or controls the uplink data to be sent with a low power. Or, the base station still decides whether to schedule uplink or downlink according to the loads of the uplink and downlink services, but at this moment, the data transmission power is lower than that when the perceived signal energy is less than the threshold. Then, the base station sends scheduling information to a terminal, or the scheduling information has been sent to a UE before; at this moment, a 1-bit trigger signaling is sent only to indicate whether to send uplink or downlink data.

When scheduling or triggering to send the uplink data, due to possible hidden nodes, the UE needs to perform perception again in a Gap between downlink control and uplink data before sending the uplink data. This perception is an energy detection of a predefined duration, such as 25 ms or 9 ms. When the detected energy within this time is less than the threshold, the data is sent according to the power coefficient given by the base station, and when the detected energy is greater than the threshold, the data is not sent or the scheduled data is sent with a low power.

The embodiment provides another method to reduce the interference problem between neighboring cells. Two base stations of the same operator negotiate uplink and downlink configurations through an X2 port to coordinate interference and avoid uplink and downlink interferences. Specifically, for the neighboring cells, at least partial subframes are aligned in uplink and downlink, and types of the interacted subframe are semi-statically notified through the X2 port. Some subframes are uplink subframes and some subframes are downlink subframes. The remaining subframes are independently configured for each cell, and are flexible uplink and downlink subframes. Then, the base station notifies fixed subframe configurations through RRC messages. The partial subframes are used for transmitting more important uplink and downlink information.

For example, two base stations fix uplink and downlink subframes through negotiation. For example, subframes 0 and 1 are fixed for downlink transmission and a subframe 2 is fixed for uplink transmission. Or, subframes 5 and 6 are fixed for downlink transmission and a subframe 7 is fixed for uplink transmission. The fixed uplink subframes are used for feeding back a Sounding Reference Signal (SRS) of a transmission channel, a Physical Random Access Channel (PRACH), Channel State Information (CSI), or transmitting a User Class Identifier (UCI), or the fixed uplink subframes are used for transmitting retransmitted data, such as the subframe 2 or the subframe 7. Then, the base station performs uplink or downlink scheduling based on the channel information. The fixed downlink subframes are used for transmitting a Demodulation Reference Signal (DRS), such as the subframes 0,1 or the subframes 5,6. The flexible subframes are used for the station to configure according to the loads of the services in each time.

After knowing which subframes are uplink subframes through Radio Resource Control (RRC) messages and dynamic signaling, the UE does not need to perform blind detection and measurement on the subframes, and then only performs blind detection and measurement on the remaining subframes, which can also reduce the power consumption of the UE to a certain extent.

The method can at least ensure that the interference of neighboring cells at a fixed moment for uplink or downlink is relatively small, and can ensure the robustness of important information in the meanwhile.

Figure 11:
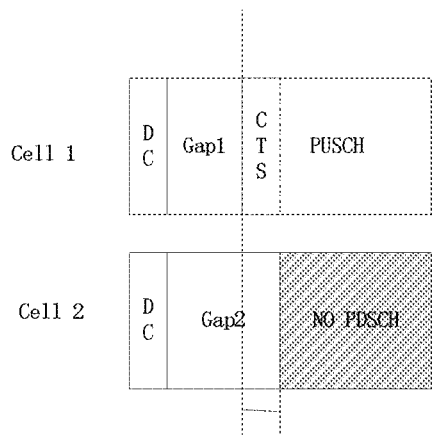
FIG. 11 is a schematic diagram illustrating data transmission according to an embodiment of the present application.

FIG. 11 is a schematic diagram illustrating data transmission according to an embodiment of the present application. A specific method for performing a perception measurement on a channel by a node mentioned in the embodiment of the present application will be described below with reference to FIG. 11. Performing the perception measurement by the node in a Gap includes at least one of the following: perceiving and monitoring CTS signals sent by other nodes, and the CTS signals carry time information of continuous data sent by the node.

As shown in FIG. 11, a cell 1 schedules a UE1 to send uplink data at a certain moment. The UE1 perceives that no signal sent by other nodes is detected or that an energy threshold of the detected signal is lower than a predefined threshold before sending the data, then sends a CTS signal, and then sends scheduled uplink data.

A base station of a neighboring cell 2 intends to send downlink data at this moment, and a service priority of the downlink data is lower than that of the uplink data sent by the cell 1, so the base station has a long perception time and perceived the CTS signal sent by the UE of the cell 1, and then cannot send downlink data. In this way, the robustness to the data transmission of a high-priority service of the neighboring cell is avoided.

Occupying signals sent by other nodes are perceived, and the occupying signals include a preamble, a pilot sequence, an SRS, a Demodulation Reference Signal (DMRS) and a DRS, wherein the DMRS is used for uplink control and correlated demodulation of data channels, and the DRS is used for demodulation of a UE only in a beamforming mode. An energy on the detected channel is perceived, and a total energy in a Gap time is compared with a pre-determined threshold. A CTS signal sent by a data receiving end is perceived, and interference of the signal is detected, and a relationship between the SNR and the pre-determined threshold is judged. Or, LBT is directly executed; if the LBT is successful, then the data is sent at a pre-determined power; if the LBT is unsuccessful, then the data cannot be sent.

When the service priorities of the sent data are the same, the following perception measurement method can also be adopted. The node randomly selects a time with a length of t from the Gap time for perception, and immediately sends the data if the perceived signal energy is less than a predefined value.

It should be noted that the nodes described in the embodiment of the present application include a Node B, an eNode B, a Home Node B, a Relay Node (RN), a User Equipment (UE), an access point, a station, etc.

Through the description of the above embodiments, those skilled in the art can clearly understand that the method according to the above embodiments can be implemented by means of software plus a necessary general hardware platform, and of course, the method can be implemented by means of hardware, but in many cases, the former is a better implementation manner. Based on such understanding, the essence of the technical solutions of the present application, or the part contributing to the prior art, may be embodied in the form of a software product which is stored in a storage medium (such as a ROM/RAM, a magnetic disk, an optical disk) including a number of instructions such that a terminal device (which may be a handset, a computer, a server, or a network device, etc.) performs all or part of the method described in each of the embodiments of the present application.

Second Embodiment

There is also provided a node and a terminal in the embodiments. The device is adapted to implement the foregoing embodiments and preferred implementation manners, but those which have been described will not be described repeatedly. As used below, the term "module" can implement a combination of software and/or hardware with a pre-determined function. Although the apparatus described in the following embodiment is preferably implemented by means of software, the implementation of hardware or a combination of software and hardware is also possible and conceived.

Figure 12:
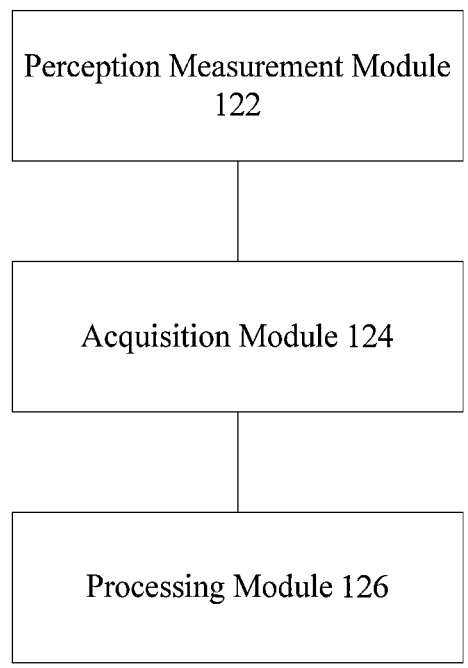
FIG. 12 is a block diagram illustrating a structure of a node according to an embodiment of the present application.

FIG. 12 is a block diagram illustrating a structure of a node according to an embodiment of the present application. As shown in FIG. 12, the node includes:

a perception measurement module 122 configured to, before sending data, perform a perception measurement on a first channel transmitting the data within a pre-determined duration;

an acquisition module 124 connected to the above-mentioned perception measurement module 122 and configured to acquire a first perception measurement result of the perception measurement; and a processing module 126 connected to the above-mentioned acquisition module 124 and configured to process the data according to the first perception measurement result.

Optionally, the node is notified of the pre-determined duration through one of the following manners: notifying the node of the pre-determined duration through a dynamic physical layer signaling indication; notifying the node of the pre-determined duration through a dynamic physical layer signaling indication; notifying the node of the pre-determined duration through a multicast signaling or a system message; and notifying the node of the pre-determined duration through a predefined manner.

Optionally, the pre-determined duration is set according to a Quality of Service QoS or a grade of service corresponding to the data.

Optionally, the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled by the downlink control information in the frame, or filling the pre-determined duration between the region for sending downlink control information and a downlink service data region scheduled by the downlink control information in the frame; and filling the pre-determined duration at the beginning or end of a time slot in which the frame is located.

Optionally, the processing module is further configured to determine a sending power for sending the data according to the perception measurement result; and send the data through the sending power.

Optionally, the processing module is further configured to, in the case that an energy of the first channel transmitting the data is less than or equal to a pre-determined threshold by perception measurement within the pre-determined duration, determine that the sending power is a preset first sending power; and, in the case that the energy of the first channel transmitting the data is greater than the pre-determined threshold by perception measurement within the pre-determined duration, determine that the sending power is a second sending power, wherein the second sending power is less than the first sending power.

Optionally, the processing module is further configured to, in the case that an energy of the first channel transmitting the data is greater than a pre-determined threshold by perception measurement within the pre-determined duration, wait for rescheduling, or perform random backoff, or send the data through a second channel.

Optionally, the processing module is further configured to directly send the data; or, send an identification firstly, and then send the data, wherein the identification is used for indicating at least one of the following information: the first channel transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

Optionally, the identification includes: a perception signal or a sequence, wherein the perception signal includes an occupying signal which further includes a beacon signal and a Clear to Send (CTS) signal respect to an unlicensed carrier, and the perception signal or the sequence carries channel occupation information.

Optionally, the processing module is further configured to, in the case of no scheduling when sending uplink data, adjust the sending power by an open-loop power control manner to acquire the second sending power, and send the data through the second sending power, wherein the second sending power is less than the first sending power; in the case of scheduling when sending uplink data, select the smaller of two power control coefficients pre-allocated at a network side to adjust the sending power to acquire the second sending power, and send the data through the second sending power, wherein the second sending power is less than the first sending power; and when sending downlink data, adjust the power control coefficients to acquire the second sending power, and send the data through the second sending power, wherein the second sending power is less than the first sending power.

Optionally, the processing module is further configured to detect an identification transmitted by the first channel, identify and select different codebooks or spreading codes to send the data in the first channel; and notify another node to perform the perception measurement on the first channel.

Optionally, the perception measurement module is further configured to detect an energy of an entire system bandwidth within the pre-determined duration; and only detect an energy at a frequency domain position of the data to be sent.

Optionally, in the case of no scheduling, the perception measurement module is further configured to acquire a time-frequency resource of the first channel according to the perception measurement performed on the first channel transmitting the data; and determine at least one of the following information through the time-frequency resource: a preamble sequence; a pilot sequence; a codebook; a frequency hopping pattern; a power; a Modulation and Coding Scheme MCS; and a Transmission Block Size TBS.

Optionally, when the perception measurement module performs the perception measurement on the first channel transmitting the data, a second node performs a perception measurement on a channel transmitting data to be sent by the second node; the second node acquires a second perception measurement result of the perception measurement; and the second node processes the data according to the second perception measurement result.

Optionally, a structure of a frame transmitting the data includes at least one of the following: a pre-determined duration region, a region for sending downlink control information, a pre-determined duration region for uplink and downlink switching, and an uplink region for sending, wherein the pre-determined duration region is used for storing the pre-determined duration, the pre-determined duration is used for the first node to perform the perception measurement before sending the data, the pre-determined duration region is located at the beginning of a subframe of the frame, or, at the beginning of a time slot in which the frame is located, or between a downlink control information region and the uplink region for sending, and the uplink region includes an uplink control region and an uplink data region; the pre-determined duration region, the region for sending downlink control information, a first pre-determined duration region for uplink and downlink switching, an uplink region for sending, and a downlink region for sending, wherein the pre-determined duration region is used for storing the pre-determined duration, the pre-determined duration is used for the node to perform the perception measurement before sending the data, the pre-determined duration region is located at the beginning of the subframe of the frame, or, at the beginning of the time slot in which the frame is located, or, between the downlink control information region and the uplink region for sending, the downlink region includes a downlink control region and a downlink data region, and a second pre-determined duration region for uplink and downlink switching is stored at the end of the subframe of the frame or the time slot, the pre-determined duration region, and a region for sending uplink data, wherein the pre-determined duration region is used for storing the pre-determined duration, the pre-determined duration is used for the node to perform the perception measurement before sending the data, and the pre-determined duration region is located at the beginning of the subframe of the frame, or, at the beginning of the time slot in which the frame is located; and the pre-determined duration region, an identification sequence, and a region for sending uplink data, wherein the pre-determined duration region is used for storing the pre-determined duration, the pre-determined duration is used for the node to perform the perception measurement before sending the data, and the pre-determined duration region is located at the beginning of the subframe of the frame, or, at the beginning of the time slot in which the frame is located.

Optionally, the processing module is further configured to judge whether a number of times that the energy of the first channel transmitting the data is greater than the pre-determined threshold by continuous perception measurement reaches a pre-determined threshold; if a judgment result is yes, adjust the sending power for sending the data; and if the judgment result is no, perform random backoff and continue to perform the perception measurement on the channel transmitting the data.

Optionally, the processing module is further configured to, after judging whether the number of times that the energy of the first channel transmitting the data is greater than the pre-determined threshold by continuous perception measurements reaches the pre-determined threshold, when judging that the number of times reaching the pre-determined threshold reaches a preset number of times, transmit the data by a scheduled access manner; or, when a number of Negative Acknowledgement Signaling NACK received reaches a preset value, transmit the data by a scheduled access manner.

Figure 13:
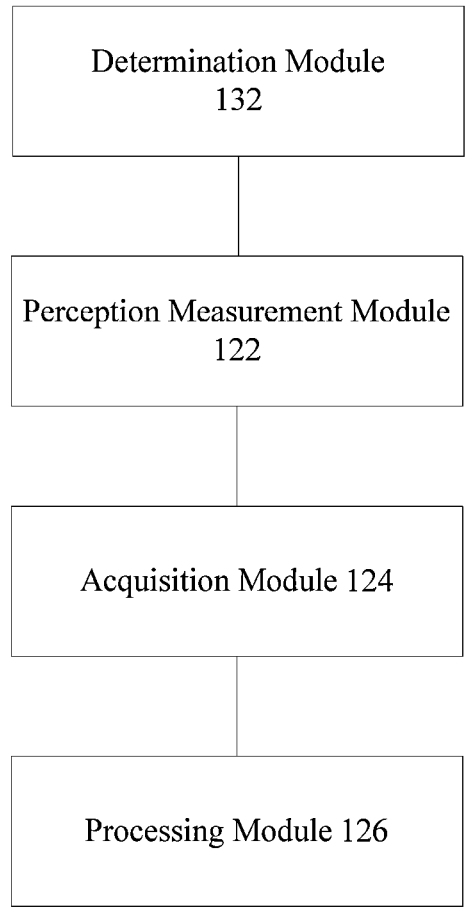
FIG. 13 is a block diagram illustrating a preferred structure of the node according to the embodiment of the present application.

FIG. 13 is a block diagram illustrating a preferred structure of the node according to the embodiment of the present application. As shown in FIG. 13, the node, excluding all the modules as shown in FIG. 12, further includes:

a determination module 132 configured to determine, with a node of a neighboring cell through interaction, that a first pre-determined number of subframes are all uplink subframes in a cell corresponding to the node and the neighboring cell, and a second pre-determined number of subframes are all downlink subframes in the cell corresponding to the node and the neighboring cell.

Optionally, at least one of the preamble sequence, the pilot sequence, the codebook, and the frequency hopping pattern is corresponding to a terminal identification ID.

Figure 14:
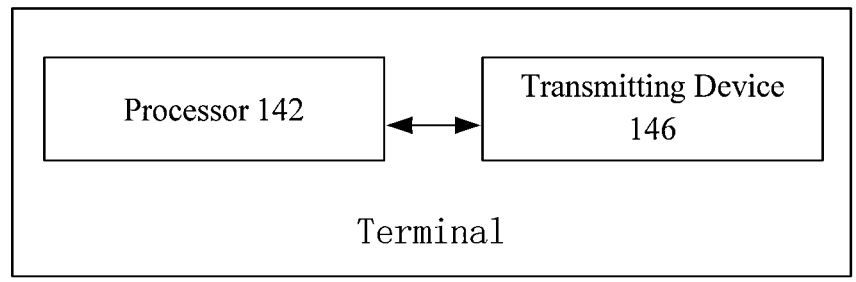
FIG. 14 is a block diagram illustrating a structure of a terminal according to an embodiment of the present application.

There is also provided a terminal in the embodiment. FIG. 14 is a block diagram illustrating a structure of a terminal according to an embodiment of the present application. As shown in FIG. 14, the terminal includes:

a processor 142 configured to, before sending data, perform a perception measurement on a first channel transmitting the data within a pre-determined duration: and further configured to acquire a first perception measurement result of the perception measurement: and a transmitting device 144 connected to the above-mentioned processor 142 and configured to process the data according to the first perception measurement result.

Optionally, the terminal is notified of the pre-determined duration through one of the following manners: notifying the terminal of the pre-determined duration through a dynamic physical layer signaling indication; notifying the terminal of the pre-determined duration through a high-layer signaling semi-static configuration manner; notifying the terminal of the pre-determined duration through a multicast signaling or a system message; and notifying the terminal of the pre-determined duration through a predefined manner.

Optionally, the pre-determined duration is set according to a Quality of Service QoS or a grade of service corresponding to the data.

Optionally, the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled by the downlink control information in the frame, or filling the pre-determined duration between the region for sending downlink control information and a downlink service data region scheduled by the downlink control information in the frame; and filling the pre-determined duration at the beginning or end of a time slot in which the frame is located.

Optionally, the processor is further configured to determine a sending power for sending the data according to the perception measurement result; and the transmitting device is further configured to send the data through the sending power.

Optionally, the processor is further configured to, in the case that an energy of the first channel transmitting the data is less than or equal to a pre-determined threshold by perception measurement within the pre-determined duration, determine that the sending power is a preset first sending power; and, in the case that the energy of the first channel transmitting the data is greater than the pre-determined threshold by perception measurement within the pre-determined duration, determine that the sending power is a second sending power, wherein the second sending power is less than the first sending power.

Optionally, the processor is further configured to, in the case that an energy of the first channel transmitting the data is greater than a pre-determined threshold by perception measurement within the pre-determined duration, wait for rescheduling, or perform random backoff, or send the data through a second channel.

Optionally, the transmitting device is further configured to directly send the data; or, send an identification firstly, and then send the data, wherein the identification is used for indicating at least one of the following information: the first channel transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

Optionally, the identification includes: a perception signal or a sequence, wherein the perception signal includes an occupying signal, the sequence includes a preamble sequence or a pilot sequence, and the perception signal or the sequence carries channel occupation information.

Optionally, the processor is further configured to, in the case of no scheduling when sending uplink data, adjust the sending power by an open-loop power control manner to acquire the second sending power, and send the data through the second sending power, wherein the second sending power is less than the first sending power; in the case of scheduling when sending uplink data, select the smaller of two power control coefficients pre-allocated at a network side to adjust the sending power to acquire the second sending power, and send the data through the second sending power, wherein the second sending power is less than the first sending power; and when sending downlink data, adjust the power control coefficients to acquire the second sending power, and send the data through the second sending power, wherein the second sending power is less than the first sending power.

Optionally, when the processor performs the perception measurement on the first channel transmitting the data, a base station performs a perception measurement on a channel transmitting data to be sent by the base station; the base station acquires a second perception measurement result of the perception measurement; and the base station processes the data according to the second perception measurement result.

Optionally, the processor is further configured to, after judging whether the number of times that the energy of the first channel transmitting the data is greater than the pre-determined threshold by continuous perception measurement reaches the pre-determined threshold, when judging that the number of times reaching the pre-determined threshold reaches a maximum number of times, transmit the data by a scheduled access manner; or, when a number of Negative Acknowledgement Signaling NACK received reaches a preset value, transmit the data by a scheduled access manner.

Optionally, the processor is further configured to determine, with a node of a neighboring cell through interaction, that a first pre-determined number of subframes are all uplink subframes in a cell corresponding to the terminal and the neighboring cell, and a second pre-determined number of subframes are all downlink subframes in the cell corresponding to the terminal and the neighboring cell.

It should be noted that the above modules can be implemented by software or hardware. For the latter, it may be implemented by the following manners, but is not limited to this: the above modules are all disposed in the same processor; or, the above modules are respectively located in different processors in any combination form.

Third Embodiment

There is also provided a storage medium in the embodiment of the present application. Optionally, the above storage medium in the embodiment may be configured to store program codes for executing the following steps:

S1: before sending data, performing, by a first node, a perception measurement on a first channel transmitting the data within a pre-determined duration;

S2: acquiring, by the first node, a perception measurement result of the perception measurement; and S3: processing, by the first node, the data according to the perception measurement result.

Optionally, the above storage medium is further configured to store program codes for executing the following step.

In S1, the first node is notified of the pre-determined duration through one of the following manners: notifying the first node of the pre-determined duration through a dynamic physical layer signaling indication; notifying the first node of the pre-determined duration through a high-layer signaling semi-static configuration manner; notifying the first node of the pre-determined duration through a multicast signaling or a system message; and notifying the first node of the pre-determined duration through a predefined manner.

Optionally, the above storage medium is further configured to store program codes for executing the following step.

In S1, the pre-determined duration is set according to a Quality of Service QoS or a grade of service corresponding to the data.

Optionally, the above storage medium is further configured to store program codes for executing the following step.

In S1, the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled in the frame, or filling the pre-determined duration between the region for sending downlink control information and a downlink service data region scheduled in the frame; and filling the pre-determined duration at the beginning or end of a time slot in which the frame is located.

Optionally, the above storage medium is further configured to store program codes for executing the following step, wherein the processing, by the first node, the data according to the perception measurement result includes:

S1; in the case that an energy of the channel transmitting the data is less than or equal to a pre-determined threshold by perception measurement within the pre-determined duration, sending, by the first node, the data through the preset first sending power; and S2: in the case that an energy of the channel transmitting the data is greater than a pre-determined threshold by perception measurement within the pre-determined duration, sending, by the first node, the data through a second sending power, or, waiting for rescheduling, or, performing random backoff, or, sending, by the first node, the data through a second modulation and coding manner, or, sending, by the first node, the data through a second channel, or, sending, by the first node, the data through a second beam.

Optionally, the above storage medium is further configured to store program codes for executing the following step, wherein the sending, by the first node, the data includes:

S1: sending, by the first node, the data directly; and

S2: sending, by the first node, an identification firstly, and then sending the data, wherein the identification is used for indicating at least one of the following information: the first channel transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

Optionally, the above storage medium is further configured to store program codes for executing the following step.

In S1, the identification includes: a perception signal or a sequence, wherein the perception signal includes an occupying signal, and the perception signal or the sequence carries channel occupation information Optionally, the above storage medium is further configured to store program codes for executing the following step.

In S1, the sending, by the first node, the data through the second sending power includes: in the case of no scheduling when sending uplink data, adjusting, by the first node, the sending power by an open-loop power control manner to acquire the second sending power, and sending the data through the second sending power, wherein the second sending power is less than the first sending power; in the case of scheduling when sending uplink data, selecting, by the first node, the smaller of two power control coefficients pre-allocated at a network side to adjust the sending power to acquire the second sending power, and sending the data through the second sending power, wherein the second sending power is less than the first sending power; and when sending downlink data, adjusting, by the first node, the power control coefficients to acquire the second sending power, and sending the data through the second sending power, wherein the second sending power is less than the first sending power.

Optionally, the above storage medium is further configured to store program codes for executing the following step.

In S1, in the case that the energy of the channel transmitting the data is greater than the pre-determined threshold by perception measurement within the pre-determined duration, the first node detects an identification transmitted by the first channel, identifies and selects different codebooks or spreading codes to send the data in the first channel.

The first node notifies another node to perform the perception measurement on the first channel.

Optionally, the above storage medium is further configured to store program codes for executing the following step.

In S1, in the case of no scheduling, the performing the perception measurement on the first channel transmitting the data within the pre-determined duration includes: acquiring a time-frequency resource of the first channel according to the perception measurement performed on the first channel transmitting the data; and determining at least one of the following information through the time-frequency resource: a preamble sequence: a pilot sequence; a codebook; a frequency hopping pattern; a power; a Modulation and Coding Scheme MCS; and a Transmission Block Size TBS.

Optionally, the above storage medium is further configured to store program codes for executing the following steps.

S1: when the first node performs the perception measurement on the channel transmitting the data, performing, by a second node, a perception measurement on a channel transmitting data to be sent by the second node:

S2: acquiring, by the second node, a perception measurement result of the perception measurement; and S3: processing, by the second node, the data according to the perception measurement result.

Optionally, the above storage medium is further configured to store program codes for executing the following step.

In S1, a structure of a frame transmitting the data includes at least one of the following:

a pre-determined duration region, a region for sending downlink control information, a pre-determined duration region for uplink and downlink switching, and an uplink region for sending, wherein the pre-determined duration region is used for storing the pre-determined duration, the pre-determined duration is used for the first node to perform the perception measurement before sending the data, the pre-determined duration region is located at the beginning of a subframe of the frame, or, at the beginning of a time slot in which the frame is located, or, between a downlink control information region and the uplink region for sending, and the uplink region includes an uplink control region and an uplink data region; the pre-determined duration region, the region for sending downlink control information, a first pre-determined duration region for uplink and downlink switching, an uplink region for sending, and a downlink region for sending, wherein the pre-determined duration region is used for storing the pre-determined duration, the pre-determined duration is used for the first node to perform the perception measurement before sending the data, the pre-determined duration region is located at the beginning of the subframe of the frame, or, at the beginning of the time slot in which the frame is located, or, between the downlink control information region and the uplink region for sending, the downlink region includes a downlink control region and a downlink data region, and a second pre-determined duration region for uplink and downlink switching is stored at the end of the subframe of the frame or the time slot; the pre-determined duration region, and a region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located; and the pre-determined duration region, an identification sequence, and a region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located; and Optionally, the above storage medium is further configured to store program codes for executing the following step.

In S1, in the case that the energy of the channel transmitting the data is greater than the pre-determined threshold by perception measurement within the pre-determined duration, the first node judges whether a number of times that the energy of the channel transmitting the data is greater than the pre-determined threshold by perception measurement reaches a pre-determined threshold;

If a judgment result is yes, the first node adjusts the sending power for sending the data; and if the judgment result is no, the first node performs random backoff and continues to perform the perception measurement on the channel transmitting the data.

Optionally, the above storage medium is further configured to store program codes for executing the following step.

In S1, after the first node judges whether the number of times that the energy of the channel transmitting the data is greater than the pre-determined threshold by continuous perception measurements reaches the pre-determined threshold, when the first node judges that the number of times reaching the pre-determined threshold reaches a preset number of times, the data is transmitted by a scheduled access manner; or, when a number of Negative Acknowledgement Signaling NACK received by the first node reaches a preset value, the data is transmitted by a scheduled access manner.

Optionally, the above storage medium is further configured to store program codes for executing the following step.

In S1, before performing the perception measurement on the channel transmitting the data within the pre-determined duration, the first node and a node of a neighboring cell determine through interaction, that a first pre-determined number of subframes are all uplink subframes in a cell corresponding to the first node and the neighboring cell, and a second pre-determined number of subframes are all downlink subframes in the cell corresponding to the first node and the neighboring cell.

Optionally, the above storage medium is further configured to store program codes for executing the following step.

In S1, at least one of the preamble sequence, the pilot sequence, the codebook, and the frequency hopping pattern is corresponding to a terminal identification ID.

Optionally, in the embodiment, the above-mentioned storage medium may include, but is not limited to: any medium that is capable of storing program codes such as a USB disk, a Read-Only Memory (ROM), a Random Access Memory (RAM), a mobile hard disk, a magnetic disk or an optical disk, and the like.

Optionally, in the embodiment, the processor executes according to the program codes stored in the storage medium: before sending data, performing, by a first node, a perception measurement on a first channel transmitting the data within a pre-determined duration; acquiring, by the first node, a first perception measurement result of the perception measurement; and processing, by the first node, the data according to the first perception measurement result.

Optionally, in the embodiment, the processor executes according to the program codes stored in the storage medium, wherein the first node is notified of the pre-determined duration through one of the following manners: notifying the first node of the pre-determined duration through a dynamic physical layer signaling indication; notifying the first node of the pre-determined duration through a high-layer signaling semi-static configuration manner; notifying the first node of the pre-determined duration through a multicast signaling or a system message; and notifying the first node of the pre-determined duration through a predefined manner.

Optionally, in the embodiment, the processor executes according to the program codes stored in the storage medium, wherein the pre-determined duration is set according to a Quality of Service QoS or a grade of service corresponding to the data.

Optionally, in the embodiment, the processor executes according to the program codes stored in the storage medium, wherein the pre-determined duration is carried in a frame transmitting the data, and the pre-determined duration is carried in the frame through one of the following manners: filling the pre-determined duration at the beginning or end of a subframe of the frame; filling the pre-determined duration between a region for sending downlink control information and an uplink service data region scheduled in the frame, or filling the pre-determined duration between the region for sending downlink control information and a downlink service data region scheduled in the frame; and filling the pre-determined duration at the beginning or end of a time slot in which the frame is located.

Optionally, in the embodiment, the processor executes according to the program codes stored in the storage medium, wherein the processing, by the first node, the data according to the first perception measurement result includes: determining, by the first node, a sending power for sending the data according to the perception measurement result; and sending, by the first node, the data through the sending power.

Optionally, in the embodiment, the processor executes according to the program codes stored in the storage medium, wherein the determining, by the first node, the sending power for sending the data according to the first perception measurement result includes: in the case that an energy of the first channel transmitting the data is less than or equal to a pre-determined threshold by perception measurement within the pre-determined duration, determining, by the first node, that the sending power is a preset first sending power; and in the case that the energy of the first channel transmitting the data is greater than the pre-determined threshold by perception measurement within the pre-determined duration, determining, by the first node, that the sending power is a second sending power, wherein the second sending power is less than the first sending power.

Optionally, in the embodiment, the processor executes according to the program codes stored in the storage medium, wherein the processing, by the first node, the data according to the perception measurement result includes: in the case that an energy of the first channel transmitting the data is greater than a pre-determined threshold by perception measurement within the pre-determined duration, waiting, by the first node, for rescheduling, or performing random backoff, or sending, by the first node, the data through a second channel.

Optionally, in the embodiment, the processor executes according to the program codes stored in the storage medium, wherein the sending, by the first node, the data through the sending power includes: directly sending, by the first node, the data through the sending power; and sending, by the first node, an identification firstly through the sending power, and then sending the data, wherein the identification is used for indicating at least one of the following information: the first channel transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

Optionally, in the embodiment, the processor executes according to the program codes stored in the storage medium, wherein the identification includes: a perception signal or a sequence, wherein the perception signal includes an occupying signal, the sequence includes a preamble sequence or a pilot sequence, and the perception signal or the sequence carries channel occupation information.

Optionally, in the embodiment, the processor executes according to the program codes stored in the storage medium, wherein the sending, by the first node, the data through the second sending power includes: in the case of no scheduling when sending uplink data, adjusting, by the first node, the sending power by an open-loop power control manner to acquire the second sending power, and sending the data through the second sending power, wherein the second sending power is less than the first sending power; in the case of scheduling when sending uplink data, selecting, by the first node, the smaller of two power control coefficients pre-allocated at a network side to adjust the sending power to acquire the second sending power, and sending the data through the second sending power, wherein the second sending power is less than the first sending power; and when sending downlink data, adjusting, by the first node, the power control coefficients to acquire the second sending power, and sending the data through the second sending power, wherein the second sending power is less than the first sending power.

Optionally, in the embodiment, the processor executes according to the program codes stored in the storage medium, wherein in the case that the energy of the first channel transmitting the data is greater than the pre-determined threshold by perception measurement within the pre-determined duration, the first node detects an identification transmitted by the first channel, identifies and selects different codebooks or spreading codes to send the data in the first channel; and the first node notifies another node to perform the perception measurement on the first channel.

Optionally, in the embodiment, the processor executes according to the program codes stored in the storage medium, wherein in the case of no scheduling, the performing the perception measurement on the first channel transmitting the data within the pre-determined duration includes: acquiring a time-frequency resource of the first channel according to the perception measurement performed on the first channel transmitting the data; and determining at least one of the following information through the time-frequency resource: a preamble sequence; a pilot sequence; a codebook; a frequency hopping pattern; a power; a Modulation and Coding Scheme MCS; and a Transmission Block Size TBS.

Optionally, in the embodiment, the processor executes according to the program codes stored in the storage medium, wherein when the first node performs the perception measurement on the first channel transmitting the data, a second node performs a perception measurement on a channel transmitting data to be sent by the second node; the second node acquires a second perception measurement result of the perception measurement; and the second node processes the data according to the second perception measurement result.[*}

Optionally, in the embodiment, the processor executes according to the program codes stored in the storage medium, wherein a structure of a frame transmitting the data includes at least one of the following: a pre-determined duration region, a region for sending downlink control information, a pre-determined duration region for uplink and downlink switching, and an uplink region for sending, wherein the pre-determined duration region is used for storing the pre-determined duration, the pre-determined duration is used for the first node to perform the perception measurement before sending the data, the pre-determined duration region is located at the beginning of a subframe of the frame, or, at the beginning of a time slot in which the frame is located, or between a downlink control information region and the uplink region for sending, and the uplink region includes an uplink control region and an uplink data region; the pre-determined duration region, the region for sending downlink control information, a first pre-determined duration region for uplink and downlink switching, an uplink region for sending, and a downlink region for sending, wherein the pre-determined duration region is used for storing the pre-determined duration, the pre-determined duration is used for the first node to perform the perception measurement before sending the data, the pre-determined duration region is located at the beginning of the subframe of the frame, or, at the beginning of the time slot in which the frame is located, or, between the downlink control information region and the uplink region for sending, the downlink region includes a downlink control region and a downlink data region, and a second pre-determined duration region for uplink and downlink switching is stored at the end of the subframe of the frame or the time slot; the pre-determined duration region, and a region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located; and the pre-determined duration region, an identification sequence, and a region for sending uplink data, wherein the pre-determined duration region is used for storing the pre-determined duration, the pre-determined duration is used for the first node to perform the perception measurement before sending the data, and the pre-determined duration region is located at the beginning of the subframe of the frame, or, at the beginning of the time slot in which the frame is located.

Optionally, in the embodiment, the processor executes according to the program codes stored in the storage medium, wherein in the case that the energy of the first channel transmitting the data is greater than the pre-determined threshold by perception measurement within the pre-determined duration, the first node judges whether a number of times that the energy of the first channel transmitting the data is greater than the pre-determined threshold by perception measurement reaches a pre-determined threshold; if a judgment result is yes, the first node adjusts the sending power for sending the data; and if the judgment result is no, the first node performs random backoff and continues to perform the perception measurement on the first channel transmitting the data.

Optionally, in the embodiment, the processor executes according to the program codes stored in the storage medium, wherein after the first node judges whether the number of times that the energy of the first channel transmitting the data is greater than the pre-determined threshold by perception measurement reaches the pre-determined threshold, when the first node judges that the number of times reaching the pre-determined threshold reaches a preset number of times, the data is transmitted by a scheduled access manner: or, when a number of Negative Acknowledgement Signaling NACK received by the first node reaches a preset value, the data is transmitted by a scheduled access manner.

Optionally, in the embodiment, the processor executes according to the program codes stored in the storage medium, wherein before performing the perception measurement on the first channel transmitting the data within the pre-determined duration, the first node and a node of a neighboring cell determine through interaction, that a first pre-determined number of subframes are all uplink subframes in a cell corresponding to the first node and the neighboring cell, and a second pre-determined number of subframes are all downlink subframes in the cell corresponding to the first node and the neighboring cell.

Optionally, in the embodiment, the processor executes according to the program codes stored in the storage medium: the storage medium is further configured to store program codes for executing the following steps: at least one of the preamble sequence, the pilot sequence, the codebook, and the frequency hopping pattern is corresponding to a terminal identification ID.

Optionally, for a specific example in this embodiment, reference may be made to the examples described in the foregoing embodiments and optional embodiments, which will not be elaborated in this embodiment.

It will be apparent to those skilled in the art that the above-described modules or steps of the present application may be implemented by a general purpose computing device which may be focused on a single computing device or distributed over a plurality of computing devices, which may optionally be implemented by a program code executable by the computing device, so that they may be stored in a storage device by the computing device and, in some cases, the steps shown or described may be performed in sequence different from here; or they are separately made into a single integrated circuit module, or multiple modules or steps in them are made into a single integrated circuit module. In this way, the present application is not limited to any particular combination of hardware and software.

Those described above are merely optional embodiment of the present application, but are not intended to limit the present application. The present application may have various modification and changes for those skilled in the art. Any modifications, equivalent substitutions and improvements made without departing from the spirit and principle of the present application shall all fall within the scope of protection of the present application.

INDUSTRIAL APPLICABILITY

In the embodiments of the present application, since the perception measurement is carried out on the channel transmitting data before the node transmits data, the node can know the state of the channel transmitting data according to the perception measurement results and process the data according to the state of the channel. Therefore, the problems of interference and resource collision between uplink and downlink data transmissions in neighboring cells or in the local cell in the related art can be solved, and the embodiments of the present application can be used for licensed spectrums, shared spectrums and unlicensed spectrums, which reduce the delay caused by the retransmission reduction due to the resource collision between terminal UEs under scheduling-free access in general on one hand, and reduce the neighboring cell interference problem caused by flexible TDD and the uplink and downlink interference problem under full duplex in the local cell, and improve the robustness of data transmission and the system performances.

What is claimed is:

1. A data processing method, comprising:
performing, by a first node, a perception measurement on a first channel for transmitting data within a pre-determined duration, before sending the data;
acquiring, by the first node, a first perception measurement result of the perception measurement;
determining, by the first node, a sending power for sending the data according to the perception measurement result; and
sending, by the first node, the data through the sending power;

wherein the determining, by the first node, the sending power for sending the data according to the first perception measurement result comprises: in the case that an energy of the first channel for transmitting the data is less than or equal to a pre-determined threshold by perception measurement within the pre-determined duration, determining, by the first node, that the sending power is a preset first sending power; and in the case that the energy of the first channel for transmitting the data is greater than the pre-determined threshold by perception measurement within the pre-determined duration, determining, by the first node, that the sending power is a second sending power, wherein the second sending power is less than the first sending power, and wherein the sending, by the first node, the data through the second sending power comprises:

in the case of no scheduling when sending uplink data, adjusting, by the first node, the sending power by an open-loop power control manner to acquire the second sending power, and sending the data through the second sending power;

in the case of scheduling when sending uplink data, selecting, by the first node, the smaller of two power control coefficients pre-allocated at a network side to adjust the sending power to acquire the second sending power, and sending the data through the second sending power; and when sending downlink data, adjusting, by the first node, the power control coefficients to acquire the second sending power, and sending the data through the second sending power.

2. The method according to claim 1, wherein the first node is notified of the pre-determined duration through one of the following manners:

notified the first node of the pre-determined duration through a dynamic physical layer signaling indication;

notified the first node of the pre-determined duration through a high-layer signaling semi-static configuration;

notified the first node of the pre-determined duration through a multicast signaling or a system message; and notified the first node of the pre-determined duration through a predefined manner.

3. The method according to claim 1, wherein the pre-determined duration is set according to a Quality of Service QoS or a grade of service corresponding to the data.

4. The method according to claim 1, wherein the pre-determined duration is carried in a frame transmitting the data, and the pre-determined duration is carried in the frame through one of the following manners:

carried at the beginning or end of a subframe of the frame;

carried between a region for sending downlink control information and an uplink service data region scheduled by the downlink control information in the frame, or filling the pre-determined duration between the region for sending downlink control information and a downlink service data region scheduled by the downlink control information in the frame; and carried at the beginning or end of a time slot in which the frame is located.

5. The method according to claim 1, wherein the processing, by the first node, the data according to the perception measurement result comprises:

in the case that an energy of the first channel for transmitting the data is greater than a pre-determined threshold by perception measurement within the pre-determined duration, waiting, by the first node, for rescheduling, or performing, by the first node, random backoff, or sending, by the first node, the data through a second channel.

6. The method according to claim 1, wherein the sending, by the first node, the data through the sending power comprises:

directly sending, by the first node, the data through the sending power; and sending, by the first node, an identification firstly through the sending power, and then sending the data, wherein the identification is used for indicating at least one of the following information: the first channel for transmitting the data being occupied; a modulation and coding grade for transmitting data; a codebook or spreading code for transmitting data; a beam for transmitting data; a time domain pattern for transmitting data; a frequency domain pattern for transmitting data; and a time domain pattern and a frequency domain pattern for transmitting data.

7. The method according to claim 6, wherein the identification comprises: a perception signal or a sequence, wherein the perception signal comprises an occupying signal, the sequence comprises a preamble sequence or a pilot sequence, and the perception signal or the sequence carries channel occupation information.

8. The method according to claim 1, wherein in the case that the energy of the first channel for transmitting the data is greater than the pre- determined threshold by perception measurement within the pre-determined duration, the method further comprises:

detecting, by the first node, an identification transmitted by the first channel, identifying and selecting different codebooks or spreading codes to send the data in the first channel; and notifying, by the first node, another node to perform the perception measurement on the first channel.

9. The method according to claim 1, wherein in the case of no scheduling, the performing the perception measurement on the first channel for transmitting the data within the pre-determined duration comprises:

acquiring a time-frequency resource of the first channel according to the perception measurement performed on the first channel for transmitting the data; and determining at least one of the following information through the time-frequency resource: a preamble sequence; a pilot sequence; a codebook; a frequency hopping pattern; a power; a Modulation and Coding Scheme MCS; or a Transmission Block Size TBS.

10. The method according to claim 1, wherein:

when the first node performs the perception measurement on the first channel for transmitting the data, a second node performs a perception measurement on a channel transmitting data to be sent by the second node;

the second node acquires a second perception measurement result of the perception measurement; and the second node processes the data according to the second perception measurement result.

11. The method according to claim 1, wherein a structure of a frame for transmitting the data comprises one of the followings:

a pre-determined duration region, a region for sending downlink control information, a pre-determined duration region for uplink and downlink switching, or an uplink region for sending that data, wherein the pre-determined duration region is used for storing the pre-determined duration, the pre-determined duration is used for the first node to perform the perception measurement before sending the data, the pre-determined duration region is located at beginning of a subframe of the frame, or, at beginning of a time slot in which the frame is located, or, between a downlink control information region and the uplink region for sending the data, and the uplink region comprises an uplink control region and an uplink data region;

the pre-determined duration region, the region for sending downlink control information, a first pre-determined duration region for uplink and downlink switching, an uplink region for sending the data, and a downlink region for sending the data, wherein the pre-determined duration region is used for storing the pre-determined duration, the pre-determined duration is used for the first node to perform the perception measurement before sending the data, the pre-determined duration region is located at beginning of the subframe of the frame, or, at beginning of the time slot in which the frame is located, or, between the downlink control information region and the uplink region for sending the data, the downlink region comprises a downlink control region and a downlink data region, and a second pre-determined duration region for uplink and downlink switching is stored at the end of the subframe of the frame or the time slot in which the frame is located;

the pre-determined duration region, and a region for sending uplink data, wherein the pre-determined duration region is used for storing the pre-determined duration, the pre-determined duration is used for the first node to perform the perception measurement before sending the data, and the pre-determined duration region is located at beginning of the subframe of the frame, or, at beginning of the time slot in which the frame is located; and the pre-determined duration region, an identification sequence, and the region for sending uplink data, wherein the pre-determined duration region is used for storing the pre-determined duration, the pre-determined duration is used for the first node to perform the perception measurement before sending the data, and the pre-determined duration region is located at beginning of the subframe of the frame, or, at beginning of the time slot in which the frame is located.

12. The method according to claim 1, wherein in the case that the energy of the first channel for transmitting the data is greater than the pre-determined threshold by perception measurement within the pre-determined duration, the method further comprises:

judging, by the first node, whether a number of times that the energy of the first channel for transmitting the data is greater than the pre-determined threshold by perception measurement reaches a pre-determined threshold;

if a judgment result is yes, adjusting, by the first node, the sending power for sending the data; and if the judgment result is no, performing, by the first node, random backoff and continuing to perform the perception measurement on the first channel for transmitting the data.

13. The method according to claim 12, wherein after the judging, by the first node, whether the number of times that the energy of the first channel for transmitting the data is greater than the pre-determined threshold by perception measurement reaches the pre-determined threshold, the method further comprises transmitting the data by a scheduled access manner, when:

the first node judges that the number of times reaching the pre-determined threshold reaches a preset number of times; or a number of Negative Acknowledgement Signaling NACK received by the first node reaches a preset value.

14. The method according to claim 1, wherein before performing the perception measurement on the first channel for transmitting the data within the pre-determined duration, the method further comprises:

determining, by the first node and a node of a neighboring cell through interaction, that a first pre-determined number of subframes are all uplink subframes in a cell corresponding to the first node and the neighboring cell, and a second pre-determined number of subframes are all downlink subframes in the cell corresponding to the first node and the neighboring cell.

15. The method according to claim 9, wherein at least one of the preamble sequence, the pilot sequence, the codebook, or the frequency hopping pattern corresponds to a terminal identification ID.

16. A terminal, comprising:

a processor configured to perform a perception measurement on a first channel for transmitting data within a pre-determined duration, before sending the data;

the processor being further configured to:

acquire a first perception measurement result of the perception measurement;

determine a sending power for sending the data according to the perception measurement result; and send the data through the sending power;

wherein the processor is further configured to:

in the case that an energy of the first channel for transmitting the data is less than or equal to a pre-determined threshold by perception measurement within the pre-determined duration, determine that the sending power is a preset first sending power; and in the case that the energy of the first channel for transmitting the data is greater than the pre-determined threshold by perception measurement within the pre-determined duration, determine that the sending power is a second sending power, wherein the second sending power is less than the first sending power, and wherein the processor is further configured to:

in the case of no scheduling when sending uplink data, adjust the sending power by an open-loop power control manner to acquire the second sending power, and send the data through the second sending power;

in the case of scheduling when sending uplink data, select the smaller of two power control coefficients pre-allocated at a network side to adjust the sending power to acquire the second sending power, and send the data through the second sending power; and when sending downlink data, adjust the power control coefficients to acquire the second sending power, and send the data through the second sending power.

* * * * *